United States Patent
Alstad

(10) Patent No.: US 11,781,503 B2
(45) Date of Patent: Oct. 10, 2023

(54) TRANSLATING COWL THRUST REVERSER PRIMARY LOCK SYSTEM

(71) Applicant: HONEYWELL INTERNATIONAL INC., Charlotte, NC (US)

(72) Inventor: Shawn Alstad, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/648,305

(22) Filed: Jan. 19, 2022

(65) Prior Publication Data

US 2023/0228230 A1  Jul. 20, 2023

(51) Int. Cl.
*F02K 1/72* (2006.01)
*F02K 1/76* (2006.01)

(52) U.S. Cl.
CPC .............. *F02K 1/766* (2013.01); *F02K 1/72* (2013.01); *F02K 1/763* (2013.01); *F05D 2220/323* (2013.01); *F05D 2260/31* (2013.01); *F05D 2260/52* (2013.01); *F05D 2260/57* (2013.01)

(58) Field of Classification Search
CPC . F02K 1/766; F02K 1/72; F02K 1/763; F02K 1/76; F05D 2220/323; F05D 2260/31; F05D 2260/52; F05D 2260/57
See application file for complete search history.

(56) References Cited

U.S. PATENT DOCUMENTS

| | | | |
|---|---|---|---|
| 4,491,059 A * | 1/1985 | Martin | F02K 1/76 92/33 |
| 9,303,590 B2 | 4/2016 | West et al. | |
| 10,294,893 B2 | 5/2019 | Smith et al. | |
| 10,724,476 B2 | 7/2020 | Gormley et al. | |
| 11,060,481 B2 | 7/2021 | Smith et al. | |
| 2003/0159429 A1 | 8/2003 | Langston et al. | |
| 2008/0134664 A1* | 6/2008 | Brannon | F02K 1/766 60/226.2 |
| 2011/0017843 A1 | 1/2011 | Le Coq et al. | |
| 2015/0300294 A1* | 10/2015 | Chakkera | F02K 1/766 91/42 |
| 2017/0226961 A1* | 8/2017 | Smith | F02K 1/76 |
| 2021/0040915 A1 | 2/2021 | Gormley | |
| 2021/0372348 A1 | 12/2021 | Burgess | |

FOREIGN PATENT DOCUMENTS

EP  0090541 A2 * 10/1983 ............... F02K 1/76

* cited by examiner

*Primary Examiner* — Steven M Sutherland
(74) *Attorney, Agent, or Firm* — LORENZ & KOPF, LLP

(57) ABSTRACT

A primary lock system for a translating cowl thrust reverser system includes a primary lock having a housing, a lock, and a manual mechanism. The lock is disposed at least partially within, and is movable relative to, the housing and is movable between a lock position and an unlock position. The manual mechanism is coupled to the lock and is configured, in response to a manual input force supplied to the manual mechanism, to: selectively move from a first position to a second position, whereby the lock is selectively moved from the lock position to the unlock position, respectively, and selectively prevent movement of the lock out of the lock position.

17 Claims, 23 Drawing Sheets

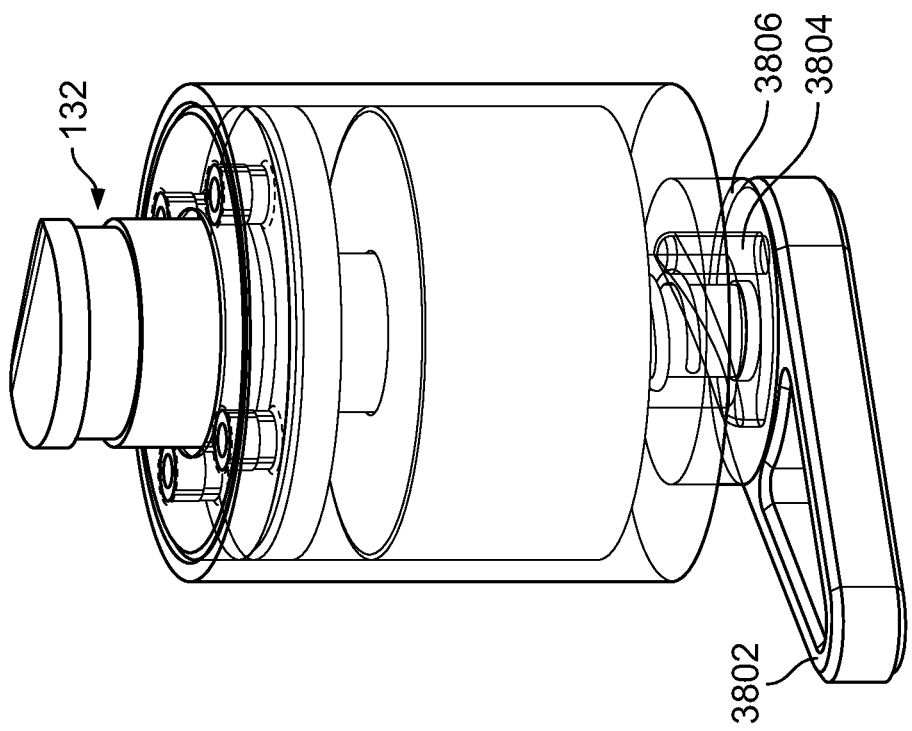
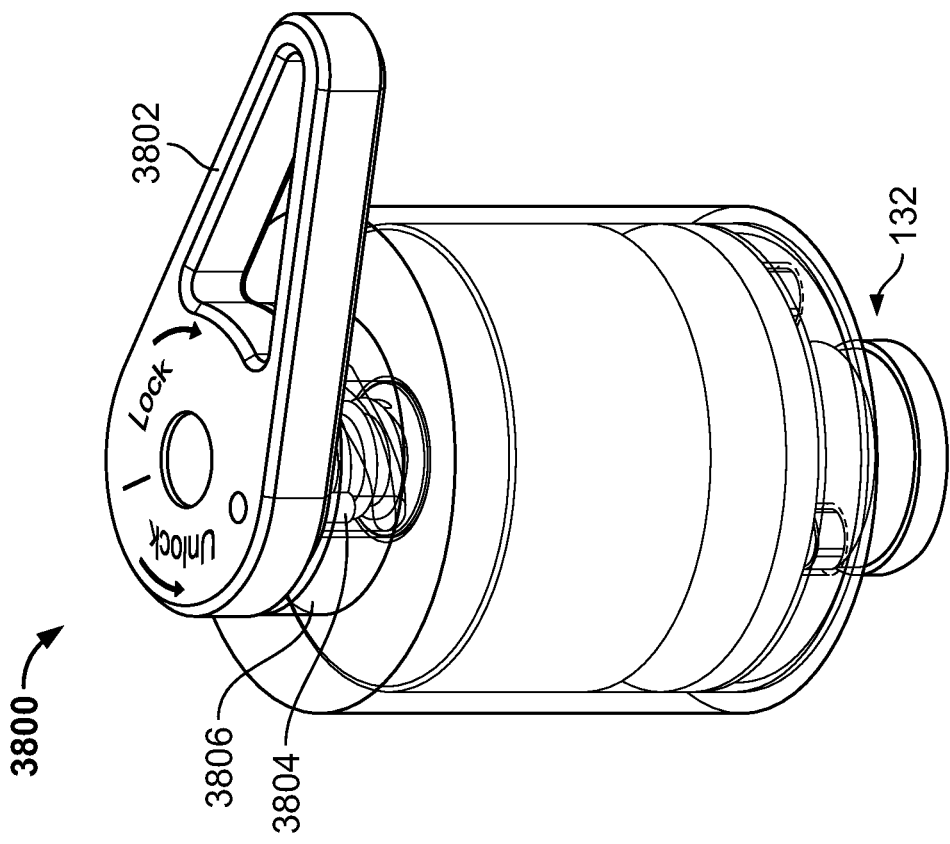

TRANSLATING COWL THRUST REVERSER PRIMARY LOCK SYSTEM

TECHNICAL FIELD

The present invention generally relates to gas turbine propulsion engine translating cowl thrust reverser systems, and more particularly relates to a primary locking system for gas turbine propulsion engine translating cowl thrust reverser systems.

BACKGROUND

When turbine-powered aircraft land, the wheel brakes and the imposed aerodynamic drag loads (e.g., flaps, spoilers, etc.) of the aircraft may not be sufficient to achieve the desired stopping distance. Thus, the engines on most turbine-powered aircraft include thrust reversers. Thrust reversers enhance the stopping power of the aircraft by redirecting the engine exhaust airflow in order to generate reverse thrust. When stowed, the thrust reverser typically forms a portion the engine nacelle and forward thrust nozzle. When deployed, the thrust reverser typically redirects at least a portion of the airflow (from the fan and/or engine core exhaust) forward and radially outward, to help decelerate the aircraft.

Thrust reverser systems are equipped with a redundant locking system to ensure that inadvertent in-flight deployment is extremely improbable. The redundant locking system typically includes one or more primary locks, one or more secondary locks, and even one or more tertiary locks. The redundant locking system is typically arranged to prevent the thrust reverser system from being deployed until it is commanded to do so.

There are typically three different static positions for most thrust reverser systems—a stowed position, a deployed position, and an overstow position. The stowed position is the normal in-flight position. The deployed position is the position when maximum reverse thrust is achieved. The overstow position is a position outside of the range between the stowed and deployed positions, when the thrust reverser system is driven past the stowed position. The overstow position is one of the various "fail-safes" designed into most thrust reverser systems. Typically, the primary locks cannot mechanically release unless the thrust reverser system is in the overstow position.

Although various types of primary locks have been, and continue to be used, a hook-type lock is one that has been widely used. However, this type of lock may exhibit certain drawbacks for some thrust reverser system configurations; most notably, for business jet translating cowl thrust reverser systems. In particular, this type of primary lock requires a relatively large amount of overstow before the hook releases from its catch. For translating cowl thrust reverser systems, the gaps between the translating cowls and the fan cowl doors may need to be greater than or equal to the overstow amount. Thus, use of a hook-type lock would mean there would be relatively large gaps at the nacelle interface between the doors and the translating cowls, which would increase air drag, decrease overall thrust-specific fuel consumption (TSFC), and be aesthetically displeasing. Moreover, there may not be a sufficiently sized space envelope on smaller engines to accommodate a hook-type lock.

Hence, there is a need for a primary locking system that can meet the same standards of the reliability as a hook-type locking system, but with less amount of overstow, while being able to fit within a relatively small space envelope, and while also providing manual unlock capability for ground maintenance, and the ability to be locked in place in the unlikely event of a damaged thrust reverser or lock component. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a primary lock system for a gas turbine propulsion engine translating cowl thrust reverser system that includes at least one translating cowl that is movable a stowed position, an overstow position, and a deployed position includes, a cowl lock structure, a cowl lock structure position sensor, a housing, a lock, a lock position sensor, and a controller. The cowl lock structure is adapted to be mounted on, and movable with, the at least one translating cowl between at least the stowed position and the deployed position. The cowl lock structure position sensor is configured to sense when the at least one translating cowl is in the overstow position and when the at least one translating cowl is not in the overstow position and supply a cowl lock structure position signal. The housing is adapted to be fixedly mounted to a non-movable structure. The lock is disposed at least partially within, and is movable relative to, the housing. The lock is responsive to an unlock command to move between a lock position, in which the lock prevents movement of the cowl lock structure toward the deployed position, and an unlock position, in which the lock is does not prevent movement of the cowl lock structure toward the deployed position. The lock position sensor is configured to sense when the lock is in the lock position and when the lock is not in the lock position and supply a lock position signal. The controller is in operable communication with the lock, the cowl lock structure position sensor, and the lock position sensor. The controller is responsive to the cowl lock structure position signal and the lock position signal to at least selectively supply the unlock command to the lock only when (i) the lock position sensor senses that the lock is in the lock position and (ii) the cowl lock structure position sensor senses that the transcowl is in the overstow position.

In another embodiment, a primary lock for a translating cowl thrust reverser system, includes a housing, a lock, and a manual mechanism. The lock is disposed at least partially within, and is movable relative to, the housing and is movable between a lock position and an unlock position. The manual mechanism is coupled to the lock and is configured, in response to a manual input force supplied to the manual mechanism, to: selectively move from a first position to a second position, whereby the lock is selectively moved from the lock position to the unlock position, respectively, and selectively prevent movement of the lock out of the lock position.

Furthermore, other desirable features and characteristics of the primary lock system and primary lock will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIGS. 38-40 depict various views of yet another alternate embodiment of the primary lock.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
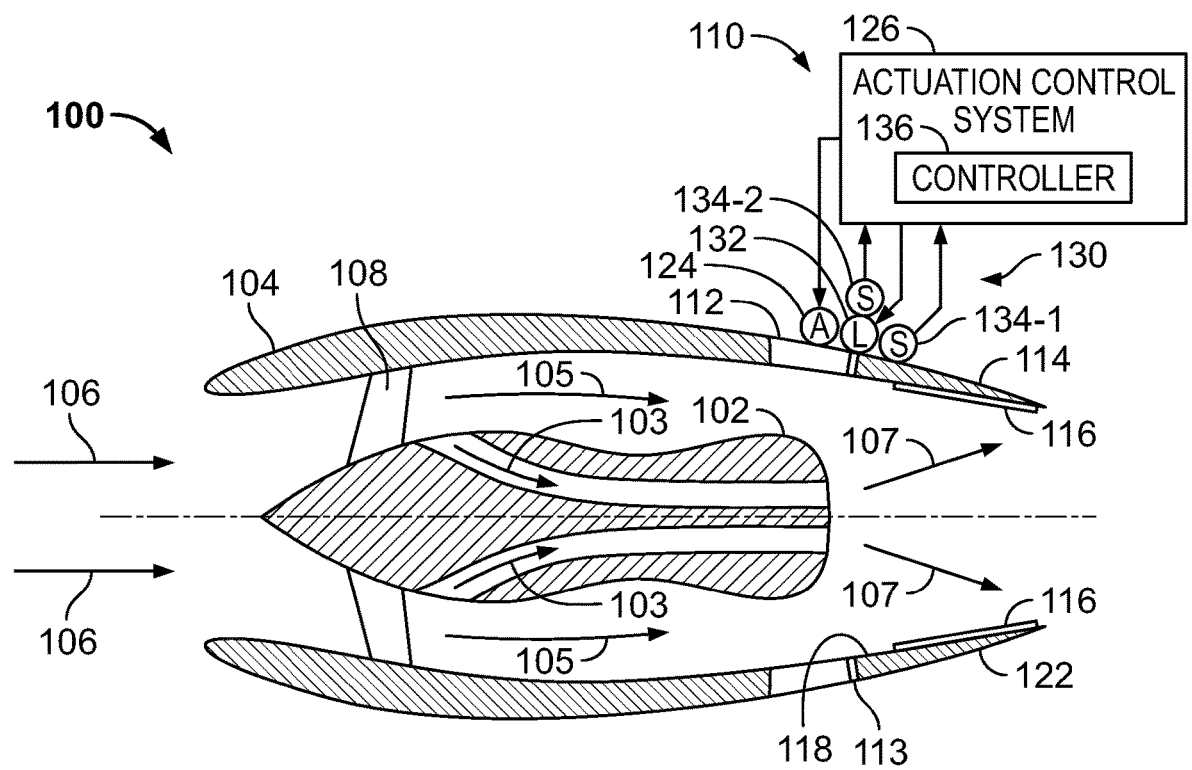
FIGS. 1 and 2 depict simplified views of an aircraft gas turbine propulsion engine equipped with a mixed flow thrust reverser system, and with the thrust reverser system in a stowed position and deployed position, respectively.
Figure 2:
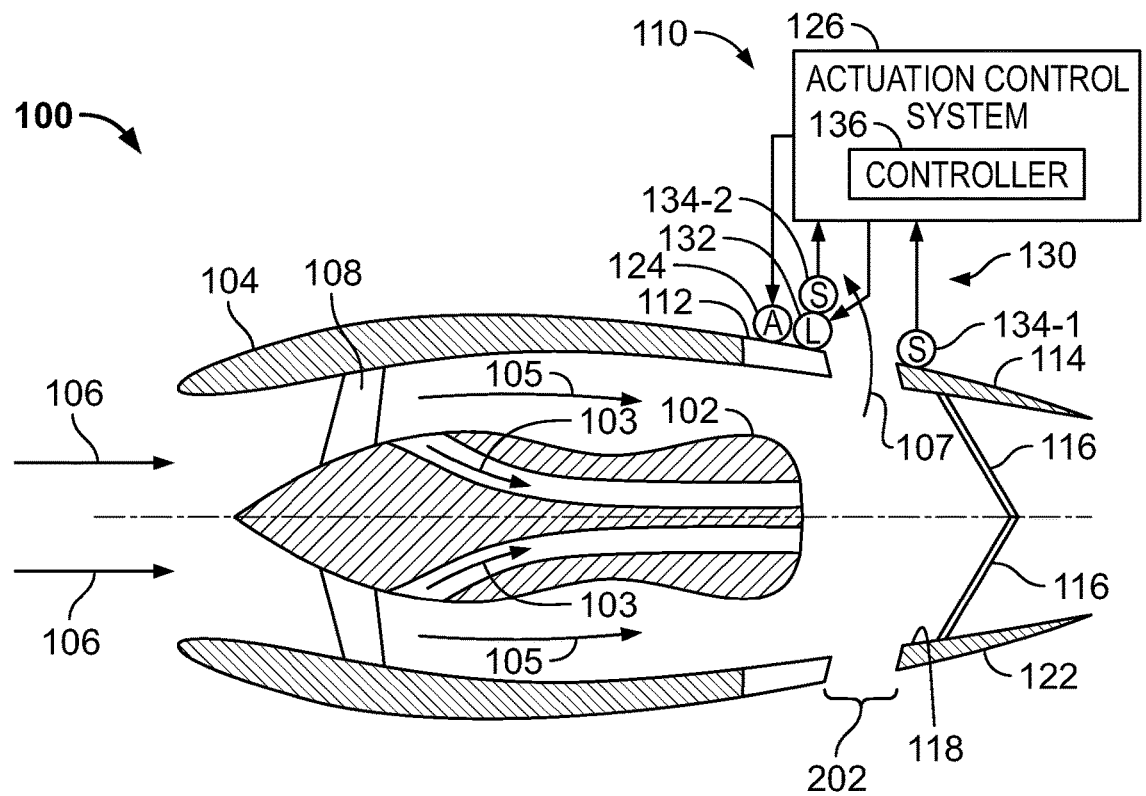
Figure 3:
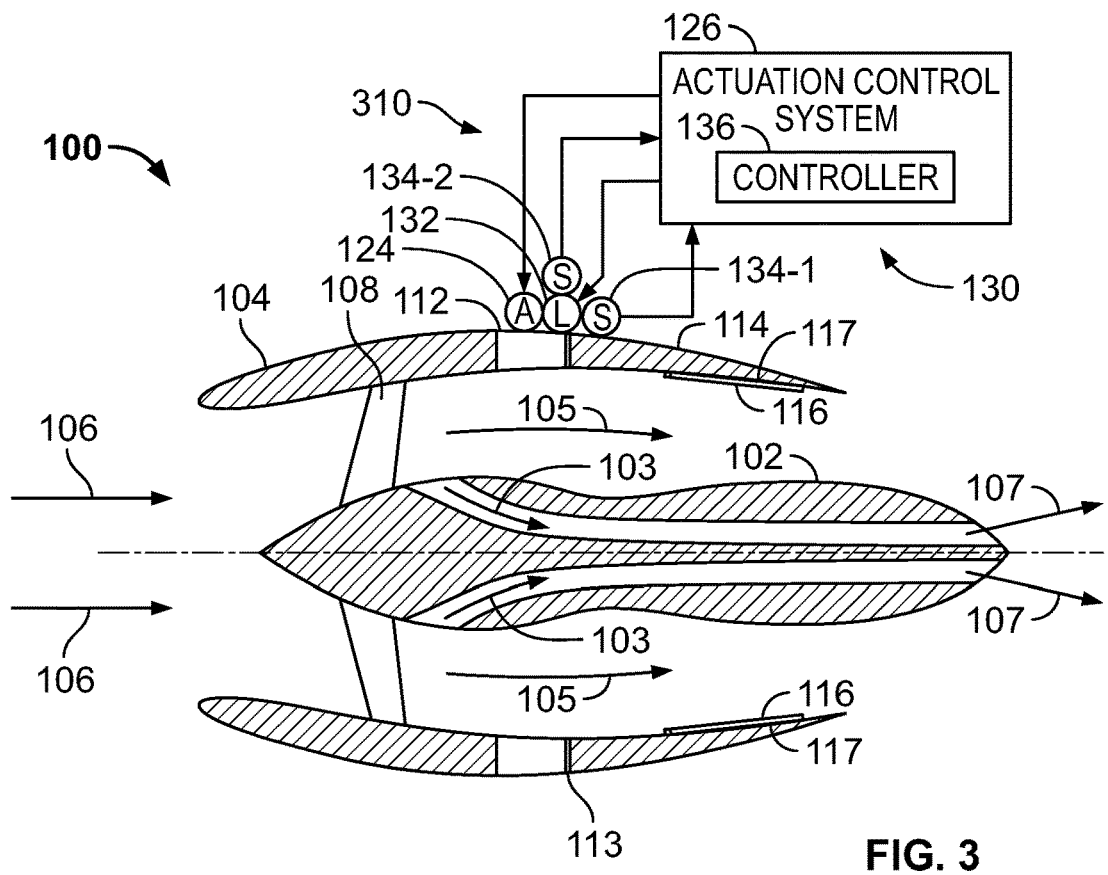
FIGS. 3 and 4 depict simplified views of an aircraft gas turbine propulsion engine equipped with a fan flow thrust reverser system, and with the thrust reverser system in a stowed position and deployed position, respectively
Figure 4:
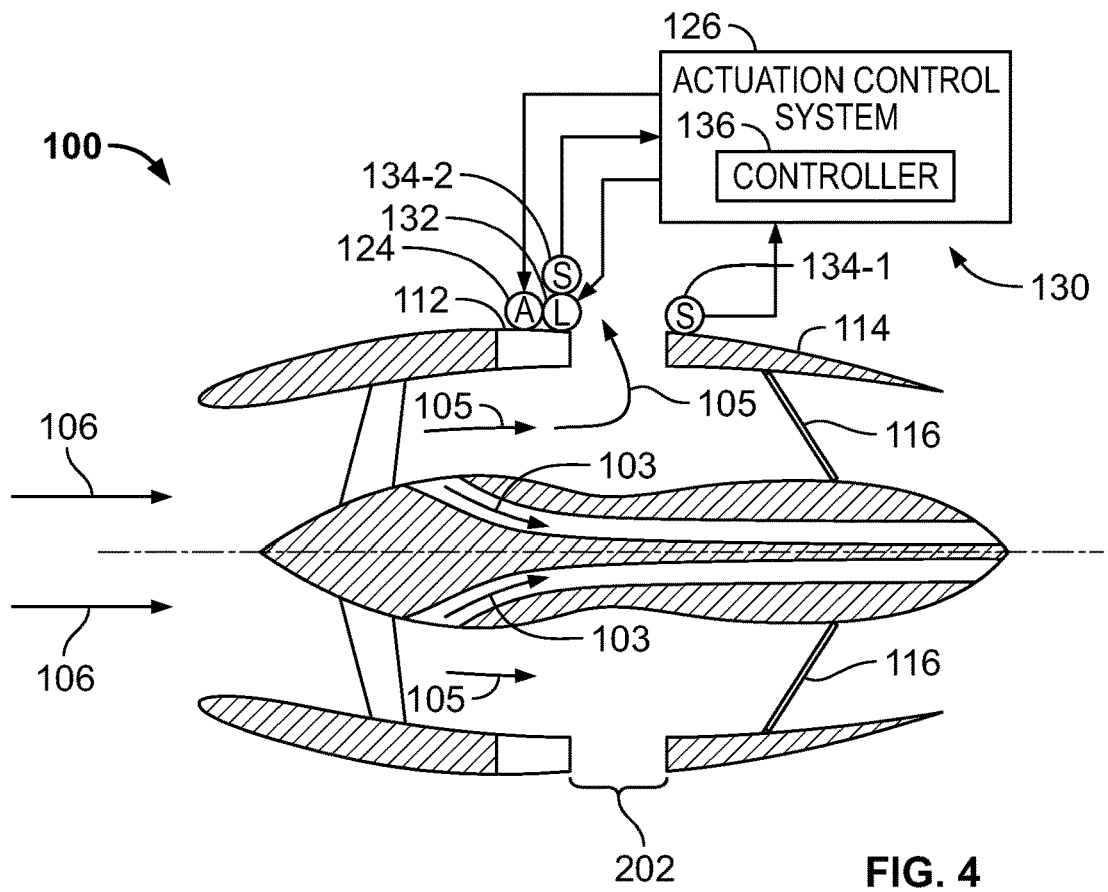

A turbofan engine is a component of an aircraft's propulsion system that typically generates thrust by means of an accelerating mass of gas. Simplified cross section views of a traditional aircraft turbofan engine 100 are depicted in FIGS. 1-4. In particular, FIGS. 1 and 2 depict the engine 100 equipped with a mixed flow thrust reverser system, and with the thrust reverser system in a stowed position and deployed position, respectively, and FIGS. 3 and 4 depict the engine 100 equipped with a fan flow thrust reverser system, and with the thrust reverser system in a stowed position and deployed position, respectively.

Referring first to FIGS. 1 and 2, the turbofan engine 100 includes a gas turbine engine 102 that is encased within an aerodynamically smooth outer covering, generally referred to as the nacelle 104. Ambient air 106 is drawn into the nacelle 104 via a rotationally mounted fan 108 to thereby supply engine airflow. A portion of the engine airflow is drawn into the gas turbine engine 102, where it is pressurized, and mixed with fuel and ignited, to generate hot gasses known as core flow 103. The remainder of engine airflow bypasses the gas turbine engine 102 and is known as fan flow 105. The core flow 103 and the fan flow 105 mix downstream of the gas turbine engine 102 to become the engine exhaust flow 107, which is discharged from the turbofan engine 100 to generate forward thrust.

The nacelle 104 comprises a mixed flow thrust reverser system 110. The thrust reverser system 110 includes a support structure 112, an annular translatable cowl, or transcowl 114, and one or more doors 116 (two in the depicted embodiment). The transcowl 114 is mounted on the support structure 112 and has an inner surface 118 and an outer surface 122. The transcowl 114 is axially translatable, relative to the support structure 112, between a stowed position, which is the position depicted in FIG. 1, a deployed position, which is the position depicted in FIG. 2, and an overstow position, which is depicted and described further below. In the stowed position, the transcowl 114 is displaced from the support structure 112 by a first distance to form a stowed position aperture 113. In the deployed position, the transcowl 114 is displaced from the support structure 112 by a second distance, which is larger than the first distance, to form a reverse thrust aperture 202 (see FIG. 2). As will be described further below, in the overstow position, the transcowl 114 is displaced from the support structure 112 by a third distance that is less than the first distance, thereby decreasing the size of the stowed position aperture 113.

Each of the one or more doors 116, at least in the depicted embodiment, is pivotally coupled to the support structure 112. It will be appreciated, however, that in other embodiments each door 116 could instead be coupled to any component that is rigidly attached to the turbofan engine. Regardless, each door 116 is rotatable between a first position, which is the position depicted in FIG. 1, a second position, which is the position depicted in FIG. 2, and a third position, which is described further below. More specifically, each door 116 is rotatable between the first position, the second position, and the third position when the transcowl 114 translates between the stowed position, the deployed position, and the overstow position, respectively. As is generally known, each door 116 is configured, when it is in the second position, to redirect at least a portion of the engine airflow through the reverse thrust aperture 202 to thereby generate reverse thrust. In particular, at least a portion of the engine exhaust flow 107 (e.g., mixed core flow 103 and fan flow 105) is redirected through the reverse thrust aperture 202.

Referring now to FIGS. 3 and 4, the turbofan engine 100 equipped with a fan flow thrust reverser system 310 will be briefly described. Before doing so, however, it is noted that like reference numerals in FIGS. 1-4 refer to like parts, and that descriptions of the like parts of the depicted turbofan engines 100 will not be repeated. The notable difference between the turbofan engine 100 depicted in FIGS. 3 and 4 is that the fan flow thrust reverser system 310 is disposed further upstream than that of the mixed flow thrust reverser system 110 depicted in FIGS. 1 and 2.

As with the mixed flow thrust reverser system 110, the depicted fan flow thrust reverser system 310 includes the support structure 112, the transcowl 114, and the one or more doors 116 (again, two in the depicted embodiment). Moreover, each door 116 is rotatable between a first position, which is the position depicted in FIG. 3, a second position, which is the position depicted in FIG. 4, and a third position, which is described further below. Similarly, each door 116 is rotatable between the first position, the second position, and the third position when the transcowl 114 translates between the stowed position, the deployed position, and the overstow position, respectively. As is generally known, each door 116 is configured, when it is in the second position, to redirect at least a portion of the engine airflow through the reverse thrust aperture 202 to thereby generate reverse thrust. In this case, however, only fan bypass flow 105 is redirected through the reverse thrust aperture 202.

As FIGS. 1-4 also depict, the thrust reverser systems 110, 310 additionally include a plurality of actuators 124 (only one depicted) and a primary lock system 130. The actuators 124 are coupled to the support structure 112 and the transcowl 114, and are configured to supply an actuation force to the transcowl 114. It will be appreciated that the actuators 124 may be implemented using any one of numerous types of electric, hydraulic, or pneumatic actuators. Regardless of the type of actuators 124 that are used, each is responsive to commands supplied from an actuation control system 126 to supply an actuation force to the transcowl 114, to thereby move the transcowl 114 between the stowed position, the deployed position, and the overstow position.

The primary lock system 130 includes a plurality of primary locks 132 (only one depicted), a plurality of position sensors 134 (e.g., 134-1, 134-2) associated with each primary lock 132, and a controller 136. The primary locks 132 (which may be referred to herein as "lock" or "locks") are coupled to the support structure 112 and are movable between a lock position and an unlock position. It will be appreciated that the locks 132 may be variously configured, and may be moved between the lock and unlock positions electrically, hydraulically, or pneumatically. Various particular configurations are described further below. Regardless, of the particular configuration that is used, each lock 132 is responsive to commands supplied from the controller 136 to move between the lock and unlock positions. In the lock position, transcowl movement toward the deployed position is prevented, and in the unlock position, transcowl movement toward the deployed position is allowed. Moreover, each lock 132 is configured such that, when the transcowl 114 is in the stowed position, movement of the lock from the lock position to the unlock position is prevented. Each lock 132 can be moved to the unlock position only when the transcowl 114 is in the overstow position.

As will be described in more detail momentarily, the position sensors 134 include a cowl lock structure position sensor 134-1 and a lock position sensor 134-2. The cowl lock structure position sensor 134-1 is configured to sense when the transcowl 114 is in the overstow position and when the transcowl 114 is not in the overstow position and to supply a cowl lock structure position signal to the controller 136. The lock position sensor 134-2 is configured to sense when the lock 132 is in the lock position and when the lock 132 is not in the lock position and to supply a lock position signal to the controller 136.

The controller 136, as illustrated in FIGS. 1-4, may be implemented as part of the actuation control system 126 or it may be implemented separately from, and operably communicate with, the actuation control system 126. Regardless of its implementation, the controller 136 is in operable communication with the lock 132 and with each of the position sensors 134. The controller 136 is responsive to the cowl lock structure position signal and the lock position signal to at least selectively supply the unlock command to the lock only when (1) the lock position sensor 134-2 senses that the lock 132 is in the lock position and (2) the cowl lock structure position sensor 134-1 senses that the transcowl 114 is in the overstow position.

Figure 5:
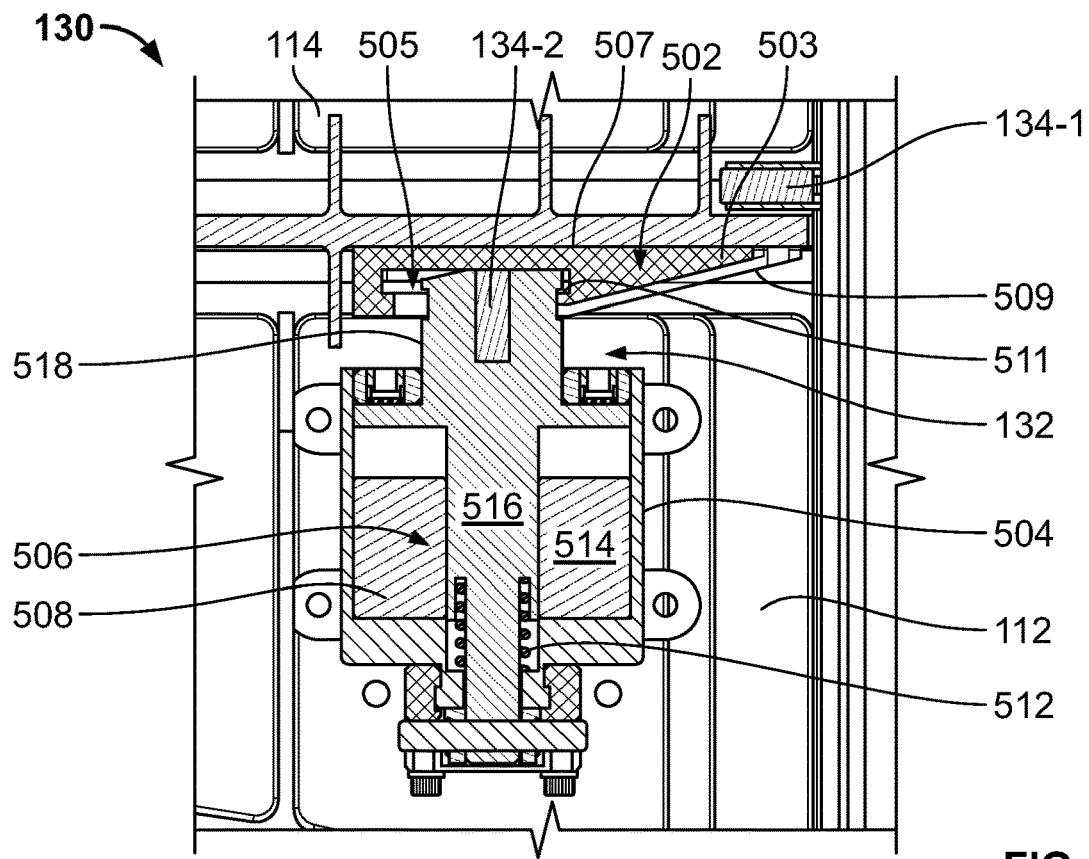
FIGS. 5-10 depict one example embodiment of a primary lock system that may be used in the thrust reverser systems 104 FIGS. 1-4, with at least portions the primary lock system being illustrated in cross section and with the primary lock in various positions.
Figure 6:
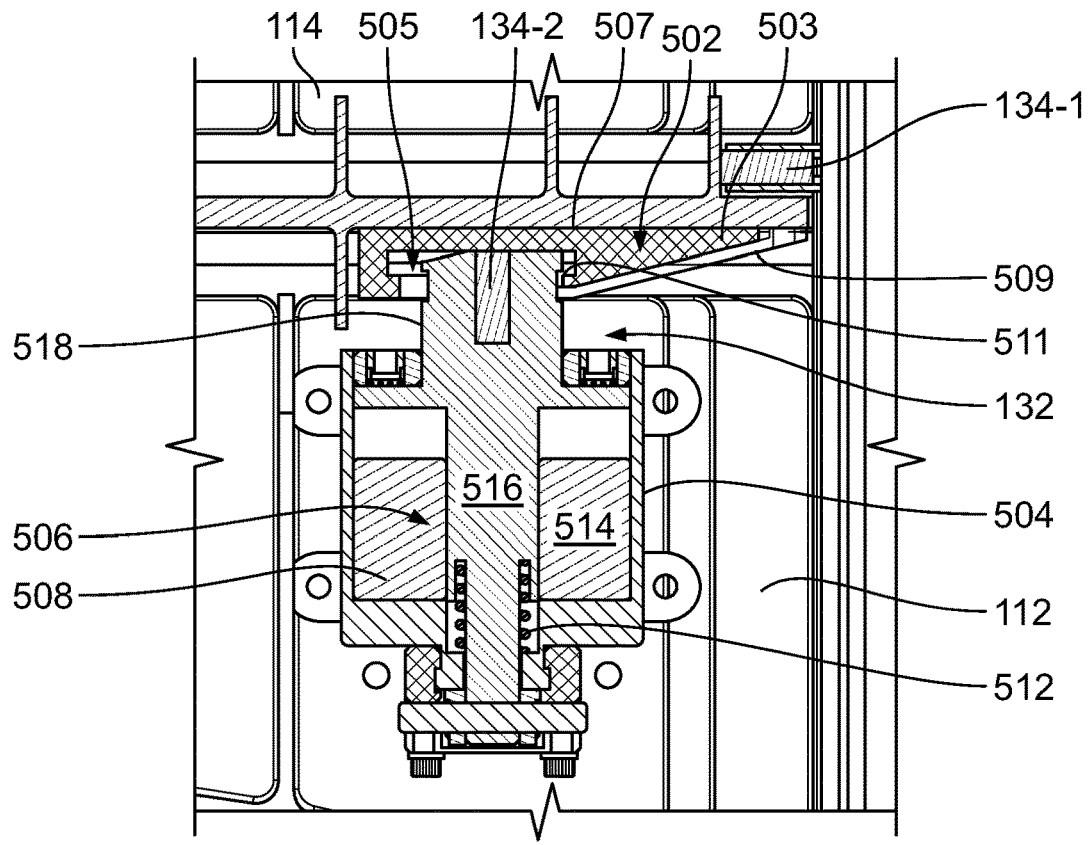
Figure 7:
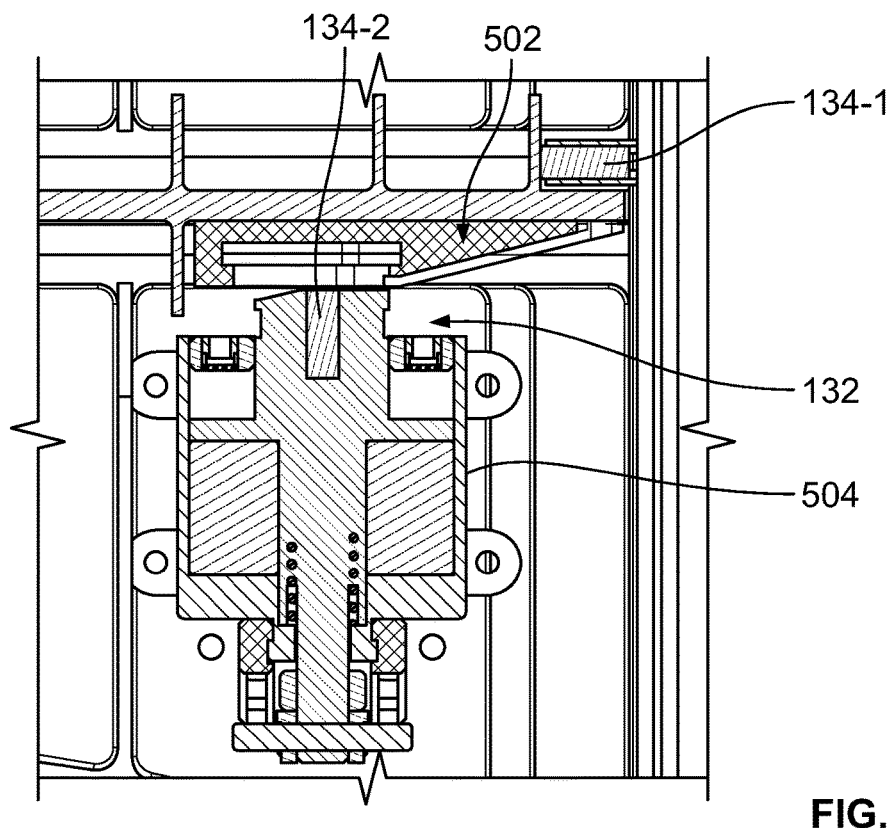

Turning now to FIGS. 5-7, a more detailed description of one embodiment the primary lock system 130 will be provided. In the depicted embodiment, the primary lock system 130 not only includes the previously mentioned lock 132, position sensors 134 (e.g., 134-1, 134-2), and controller 136 (not further depicted herein), but additionally includes a cowl lock structure 502 and a housing 504. It should be noted that, as was previously mentioned, although the primary lock system 130 includes a plurality of locks 132, only one of the locks 132 will be further depicted and described herein.

The cowl lock structure 502 is mounted on, and is movable with, the transcowl 114. The cowl lock structure 502 may be variously configured, but in the depicted embodiment it includes a main body 503 and a lock cavity 505. The main body 503 is coupled, via a mount surface 507, to the transcowl 114 and is thus movable therewith. The main body 503 additionally includes a ramped surface 509 and has the lock cavity 505 formed therein. The purpose of the ramped surface 509 is described further below. The lock cavity 505 is dimensioned to receive the lock 132 when the lock 132 is in the lock position, and is defined in part by a lock ledge 511. As clearly shown in FIG. 5, the lock ledge 511 is engaged by the lock 132 when the lock 132 is in the lock position and the transcowl 114 is in the stowed position.

The cowl lock structure position sensor 134-1, as previously noted, is configured to sense when the transcowl 114 is in the overstow position and when the transcowl 114 is not in the overstow position. To do so, the cowl lock structure position sensor 134-1 is disposed adjacent to the cowl lock structure 502. More specifically, at least in the depicted embodiment, the cowl lock structure position sensor 134-1 is coupled to the support structure 112 and senses when the transcowl 114 is, and is not, in the overstow position. Although the cowl lock structure position sensor 134-1 may be implemented using any one of numerous types of sensors to provide its functionality, in the depicted embodiment a proximity sensor is used. The type of proximity sensor used may also vary and may be any one of numerous types of capacitive, inductive, doppler, ultrasonic, or photometric types of proximity sensors, just to name a few.

The lock position sensor 134-2, as previously noted, is configured to sense when the lock 132 is, and is not, in the lock position and to supply a lock position signal. To do so, the lock position sensor 134-2 is disposed adjacent to the lock 132. More specifically, at least in the depicted embodiment, the lock position sensor 134-2 is disposed within the lock 132. Although the lock position sensor 134-2 may be implemented using any one of numerous types of sensors to provide its functionality, in the depicted embodiment a proximity sensor is also used. The type of proximity sensor used may also vary and may be any one of numerous types of capacitive, inductive, doppler, ultrasonic, or photometric types of proximity sensors, just to name a few.

The housing 504 is fixedly mounted to the support structure 112 and has the lock 132 disposed at least partially therein. The lock 132 is movable relative to the housing 504 and, as noted above, is responsive to an unlock command to move between the lock position and an unlock position. In the lock position, which is the position depicted in FIG. 5, the lock 132 prevents movement of the cowl lock structure 502, and thus the transcowl 114, toward the deploy position. In the unlock position, which is the position depicted in FIG. 7, the lock 132 does not prevent movement of the cowl lock structure 502, and thus the transcowl 114, toward the deploy position.

The lock 132 may be variously configured and implemented, but it includes at least a piston 506 and a lock actuator 508. The piston 506 is disposed partially within, and extends from, the housing 504 and is translatable between the lock and unlock position. The lock actuator 508 is responsive to the unlock command supplied from the controller 136 to move the piston 506 between the lock and unlock position. The lock 132 is preferably spring-loaded to the lock position and thus may also include a spring 512. The spring 512, when included, supplies a spring force to the piston 506 that urges it toward the lock position.

In the depicted embodiment, the lock actuator 508 is a solenoid. Thus, the piston 506 includes an armature section 516 and a lock section 518. The armature section 516 is disposed within the housing 504 and is at least partially surrounded by a coil 514. The lock section 518 is disposed outside the housing 504 and selectively engages the cowl lock structure 502. The lock section 518, at least in the depicted embodiment, also has the lock position sensor 134-2 disposed therein.

The coil 514, as just noted, surrounds at least a portion of the armature section 516 and is selectively energized by the controller 136. The spring 512 is disposed between and engages the housing 504 and the piston 506. With this configuration, when the coil 514 is de-energized the spring 512 supplies a spring force to the piston 506 that urges the piston 506, and thus the lock 132, toward the lock position. Conversely, when the coil 514 is energized the magnetic flux that is generated supplies a force to the piston 506 that overcomes the spring force and urges the piston 506, and thus the lock 132, toward the unlock position. This configuration ensures the lock 132 defaults to the lock position when power is not available, or otherwise cannot be supplied, to the coil 514.

Although the lock actuator 508 depicted in FIGS. 5-7 is implemented using a solenoid, it will be appreciated that this is merely exemplary one suitable type of lock actuator 508 that may be used. For example, the lock actuator 508 may also be implemented using any one of numerous electrical, hydraulic, or pneumatic actuators, or various combination thereof.

Before proceeding further, it is noted that in some embodiments, the cowl lock structure position sensor 134-1 and the lock position sensor 134-2 may also be configured to supply the cowl lock structure position signal and the lock position signal, respectively, to cockpit instrumentation. These embodiments allow the flight crew to know if the lock is in the locked, unlocked positions, and when the transcowl 114 is in the stowed, overstow, and deployed positions. This would let the pilot know not to take-off when the transcowl 114 is not properly locked, which could, for example, be displayed as a "primary lock fault" within the cockpit.

Having described the overall structure and function of the thrust reverser systems 110, 310 and the primary lock system 130, a description of the operation will now be provided. Referring first to FIG. 5, the transcowls 114 (only one depicted) are in the stowed position, and the lock 132 is in the lock position. As such, the cowl lock structure position signal supplied from the cowl lock structure position sensor 134-1 to the controller 136 indicates that the transcowl 114 is not in the overstow position, and the lock position sensor signal supplied from the lock position sensor 134-2 to the controller 136 indicates that the lock 132 is in the lock position. Thus, if or when a deploy command is supplied from the pilot to the actuation control system 126, the logic in the actuation control system 126 will enable movement of the transcowl 114 from the stowed position to the overstow position.

In the overstow position, the lock 132 initially remains in the lock position (see FIG. 6) and the lock position sensor signal supplied from the lock position sensor 134-2 to the controller 136 indicates such. However, the cowl lock structure position signal supplied from the cowl lock structure position sensor 134-1 to the controller 136 now indicates that the transcowl 114 is in the overstow position. Thus, as depicted in FIG. 7, the controller 136 now commands movement of the lock 132 from the lock position to the unlock position. When this occurs, the lock position sensor signal supplied from the lock position sensor 134-2 to the controller 136 indicates that the lock 132 is in the unlock position, while the cowl lock structure position signal supplied from the cowl lock structure position sensor 134-1 to the controller 136 continues to indicate that the transcowl 114 is in the overstow position. The enables the actuation control system 126 to move the transcowl 114 from the overstow position to the deployed position.

Figure 8:
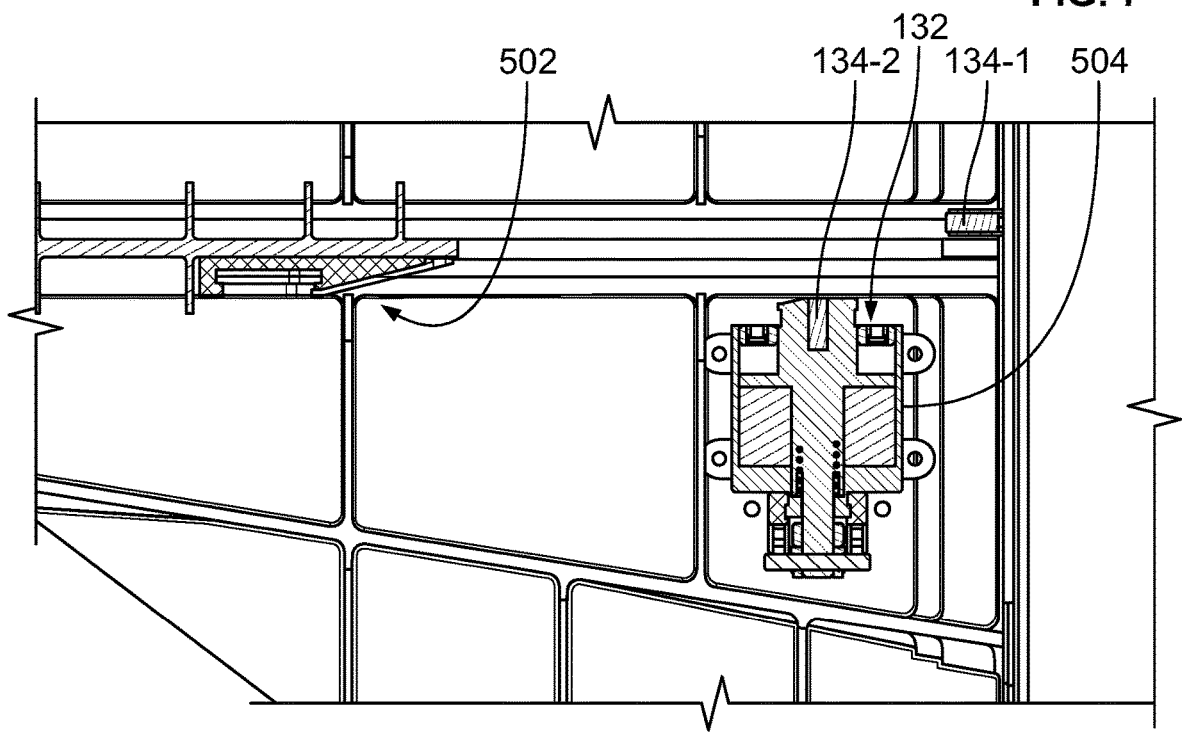

In the deployed position, which is the position depicted in FIG. 8, the cowl lock structure position signal supplied from the cowl lock structure position sensor 134-1 to the controller 136 indicates that the transcowl 114 is not in the overstow position, and the lock position sensor signal supplied from the lock position sensor 134-2 to the controller 136 indicates that the lock 132 is not engaging the cowl lock structure 502. It should be noted that when the transcowl 114 is in the deployed position, the controller 136 may continue to command the lock 132 to remain in the unlock position or it may command (or allow) the lock 132 to move back to the lock position.

Figure 9:
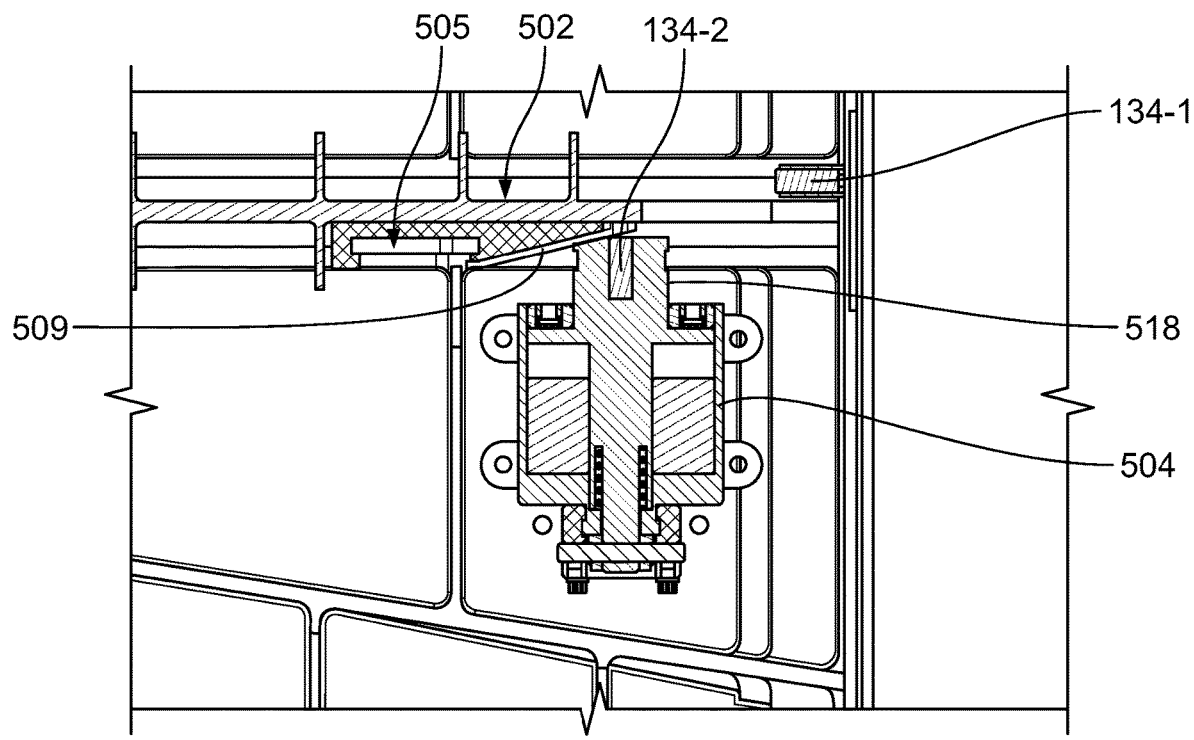
Figure 10:
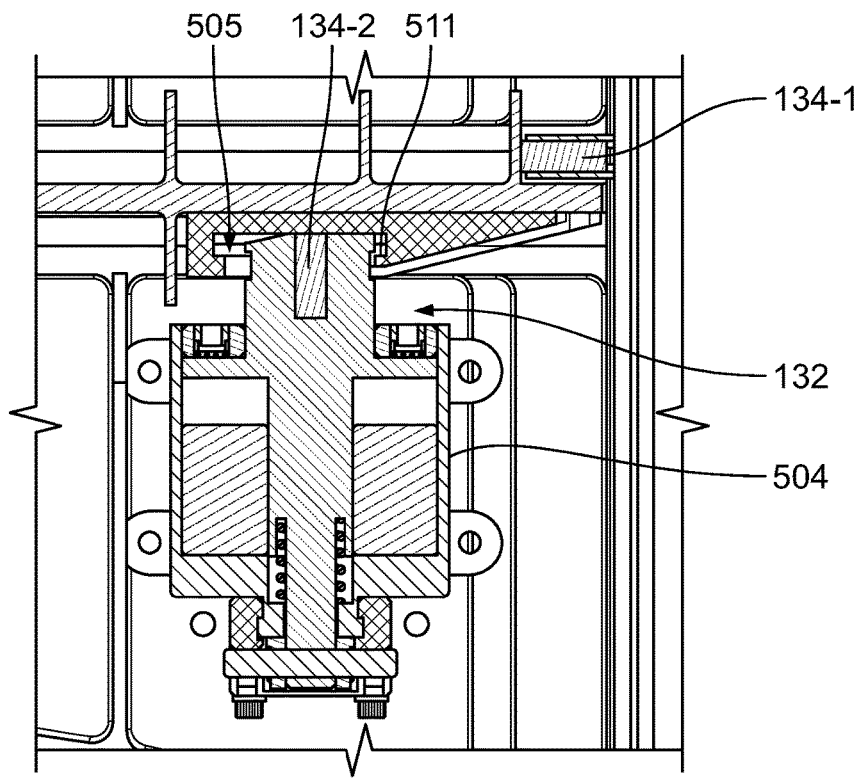

When the thrust reversers are no longer required, the actuation control system 126 will command the transcowl 114 back toward the stowed position. For embodiments in which the lock is commanded (or allowed) to move back to the lock position, as the transcowl 114 approaches the stowed position, the lock 132, and more specifically the lock section 518, engages the ramped surface 509. This is depicted in FIG. 9. Due to the structural configuration of the lock section 518 and the ramped surface 509, which will be described in more detail momentarily, the lock section 518 slides along the ramped surface 509 until, as depicted in FIG. 10, the transcowl 114 returns to the stowed position and the lock 132 reenters the lock cavity 505 and engages the lock ledge 511, locking the transcowl 114 in the stowed position.

Figure 11:
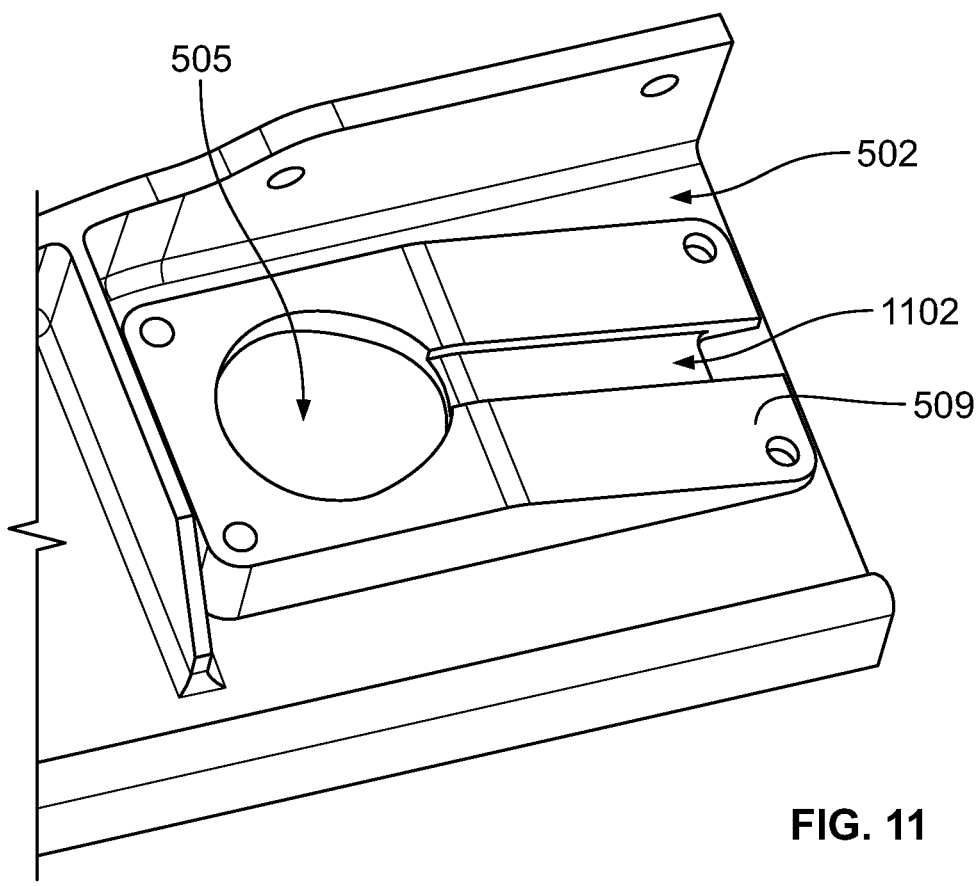
FIG. 11 depicts a plan view of one embodiment of a cowl lock structure that may be used in the primary lock system of FIGS. 5-10.
Figure 12:
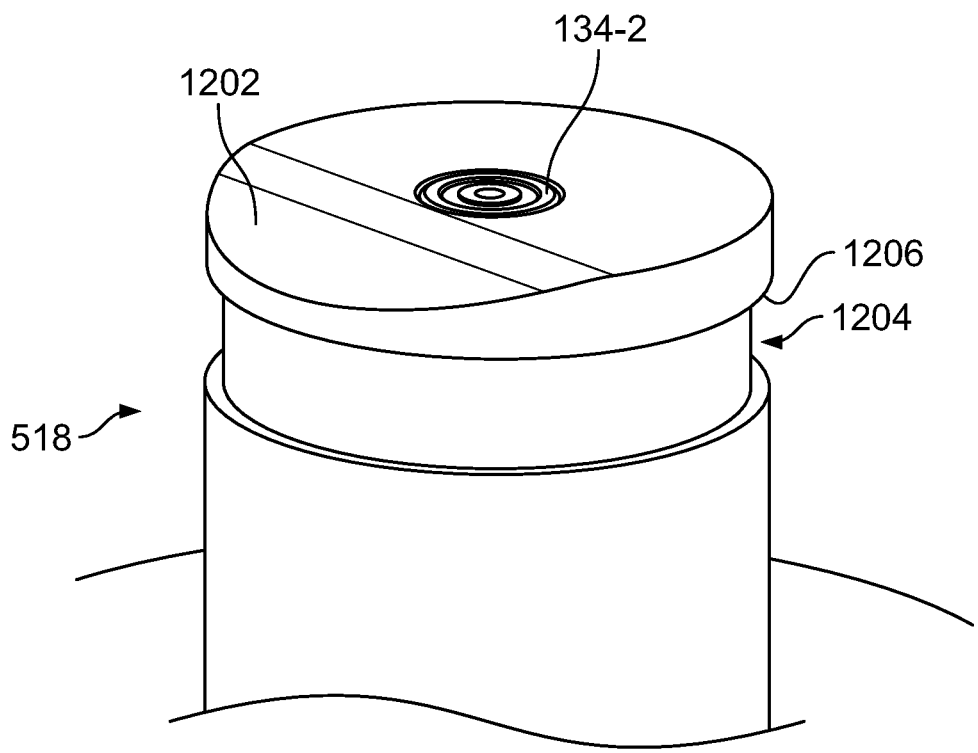
FIG. 12 depicts a plan view of a section of the lock 132 that may be used in the primary lock system of FIGS. 5-10.

Turning now to FIGS. 11 and 12, a more detailed description of one embodiment of the cowl lock structure 502 and the lock section 518 of the lock 132 will now be provided. Referring first to FIG. 11, which depicts the cowl lock structure 502, the previously described lock cavity 505 and ramped surface 509 are shown. In addition, it is seen that in the depicted embodiment a lock position sensor clearance groove 1102 is formed in the ramped surface 509. The lock position sensor clearance groove 1102 is provided so that the lock position sensor 134-2 will not indicate that the lock 132 is engaging the cowl lock structure 502 while, as depicted in FIG. 9 and described above, the lock section 518 is sliding along the ramped surface 509 back toward the lock position.

With reference to FIG. 12, one embodiment of the lock section 518 is depicted in more detail. In the depicted embodiment, the lock section 518 has a ramped surface 1202 formed in a portion thereof. It will be appreciated that the ramped surface 1202 is formed at an angle that matches the angle of the ramped surface 509 of the cowl lock structure 502. The depicted lock section 518 also has a circumferential groove 1204 formed therein. As may be appreciated, the depth of the circumferential groove 1204 sets the minimum overstow distance of the transcowl 114. The circumferential groove 1204 also defines a locking feature 1206, which is what engages the lock ledge 511 when the lock 132 is in the lock position.

Figure 13:
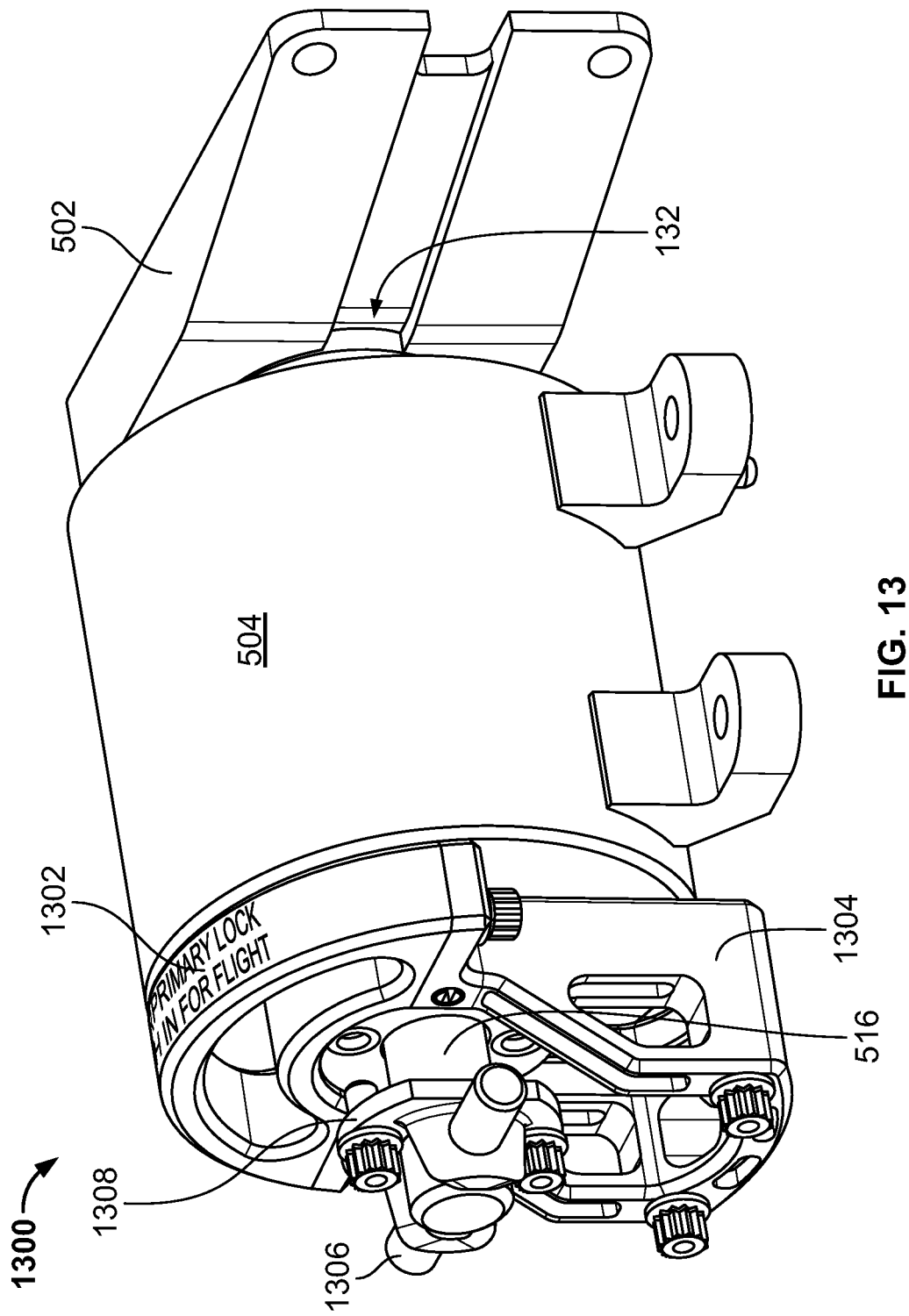
FIG. 13 depicts a plan view of one physical embodiment of the primary lock and cowl lock structure in an assembled configuration.
Figure 14:
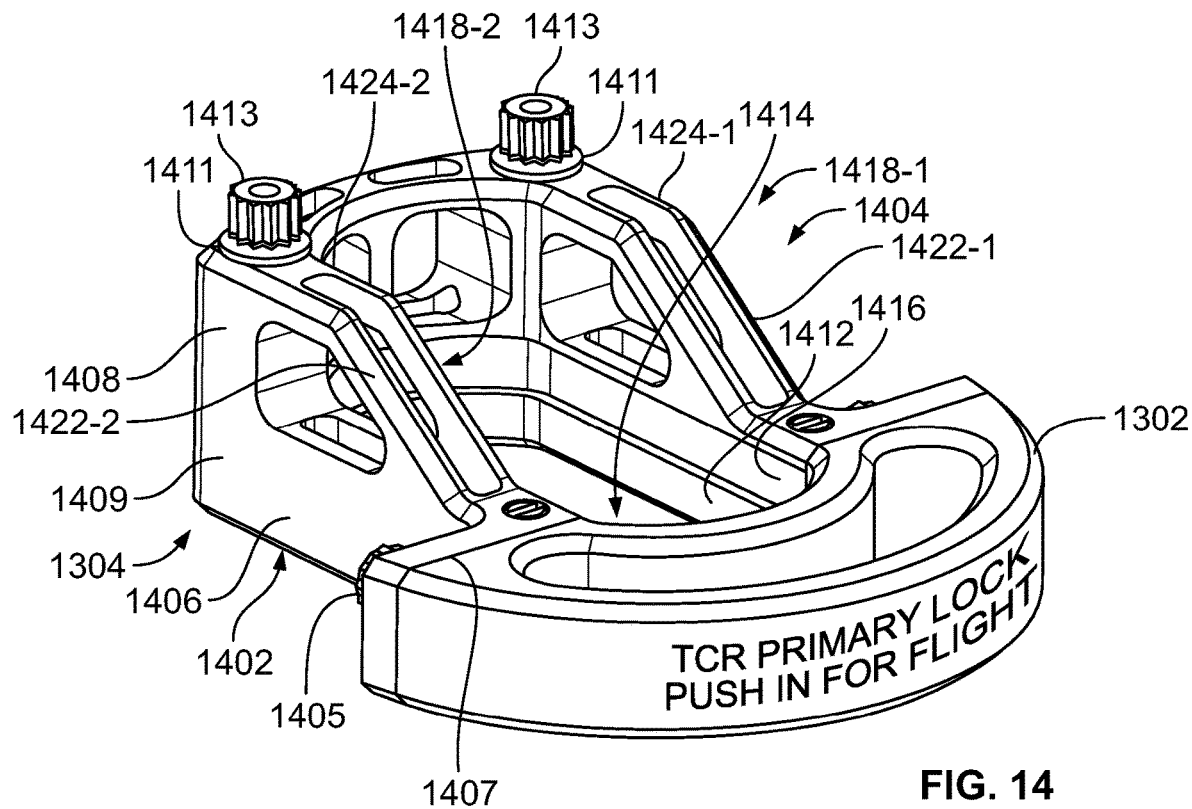
FIGS. 14 and 15 depict plan views of a manual lock mechanism that may be used with the primary lock of FIG. 13.

It was noted in the background section that it is preferable for the primary lock 132 to include manual mechanism that provides unlock capabilities for ground maintenance, and the capability to be manually locked in place in the unlikely event of a damaged thrust reverser or lock component (such as the spring 512). One embodiment of a manual lock mechanism is depicted in FIG. 13, which depicts a plan view of the manual lock mechanism 1300, the housing 504, the cowl lock structure 502, and a portion of the lock 132 (i.e., a portion of the armature section 516) extending from the housing 504. The manual lock mechanism 1300 is coupled to the lock 132 and is configured, in response to a manual input force supplied to the manual mechanism, to selectively move the lock 132 from the lock position to the unlock position. It is also configured to selectively prevent movement of the lock 132 out of the lock position.

To implement its functionality, the manual lock mechanism 1300 includes a pull handle 1302 and a ramp slider 1304. The pull handle 1302 is coupled to the ramp slider 1304 and is dimensioned to be grasped by a hand of a user (e.g., technician). The ramp slider 1304 is mounted on the housing 504 and selectively engages a pin 1306 that extends through the armature section 516 of the lock 132. As FIG. 13 also depicts, the pin 1306, at least in the depicted embodiment, also extends through a lock plate 1308 that is mounted on the armature section 516. The purpose of the lock plate 1308 will be described further below.

Referring now to FIGS. 14-17, the ramp slider 1304 is mounted on, and is movable relative to, the housing 504, and includes a main section 1402 and ramp section 1404. The main section 1402 includes a mount section 1406 and a fastener storage section 1408. The mount section 1406 includes a mount section first end 1407 and a mount section second end 1409 and is coupled, at the mount section first end 1407, to the pull handle 1302 via, for example, suitable hardware 1405. The fastener storage section 1408 extends perpendicularly from the mount section second end 1409 and includes a plurality of fastener openings 1411. A fastener 1413 is removably disposed within each fastener opening 1411, the purpose of which is described further below. The main section 1402 also has an inner surface 1412 that defines a cavity 1414 through which the armature section 516 extends. The inner surface 1412 has a main section groove 1416 formed thereon, which mates with features (described further below) on the housing 504.

The ramp section 1404 extends from the mount section first end 1407 to the fastener storage section 1408 adjacent each fastener opening 1411. The ramp section 1404 includes a pair of arms 1418—a first arm 1418-1 and a second arm 1418-2. The arms 1418 are spaced apart from each other and each includes a ramp section 1422 (1422-1, 1422-2) and a land section 1424 (1424-1, 1424-2). The ramp sections 1422 each extend from the mount section first end 1407 toward its associated land section 1424 at non-zero angle. The land sections 1424 each extend perpendicularly from the fastener storage section 1408 and connect to its associated ramp section 1422.

Figure 15:
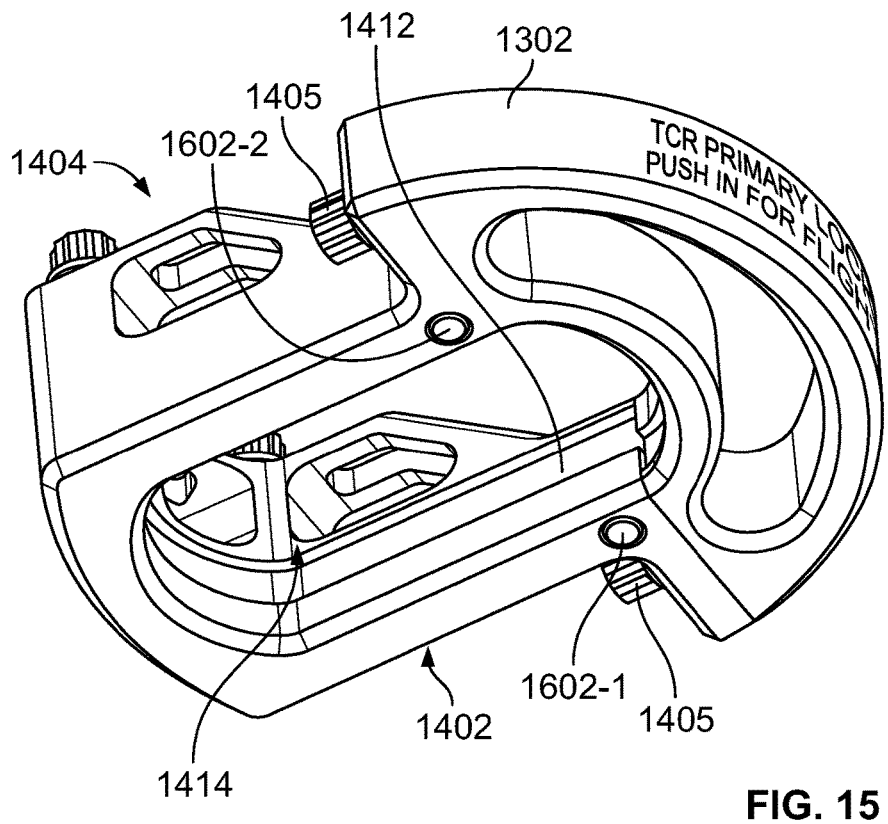
Figure 16:
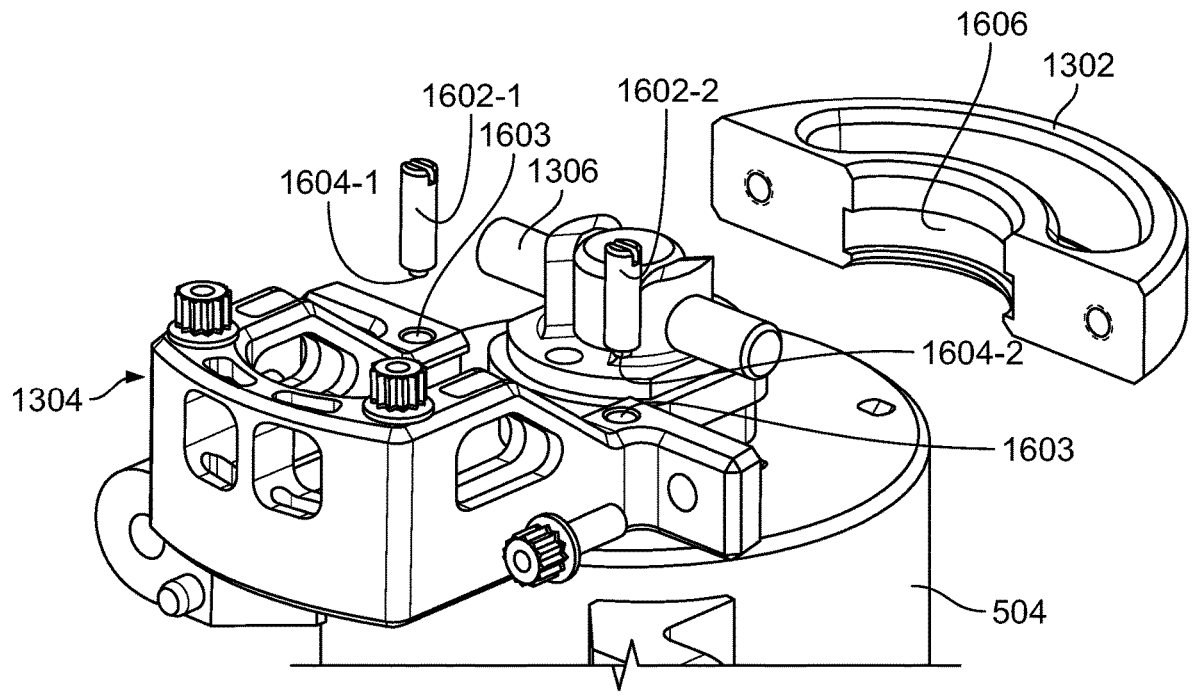
FIGS. 16 and 17 depict exploded plan views of the manual lock mechanism of FIGS. 14 and 15 illustrating how it may be mounted to the primary lock housing.
Figure 17:
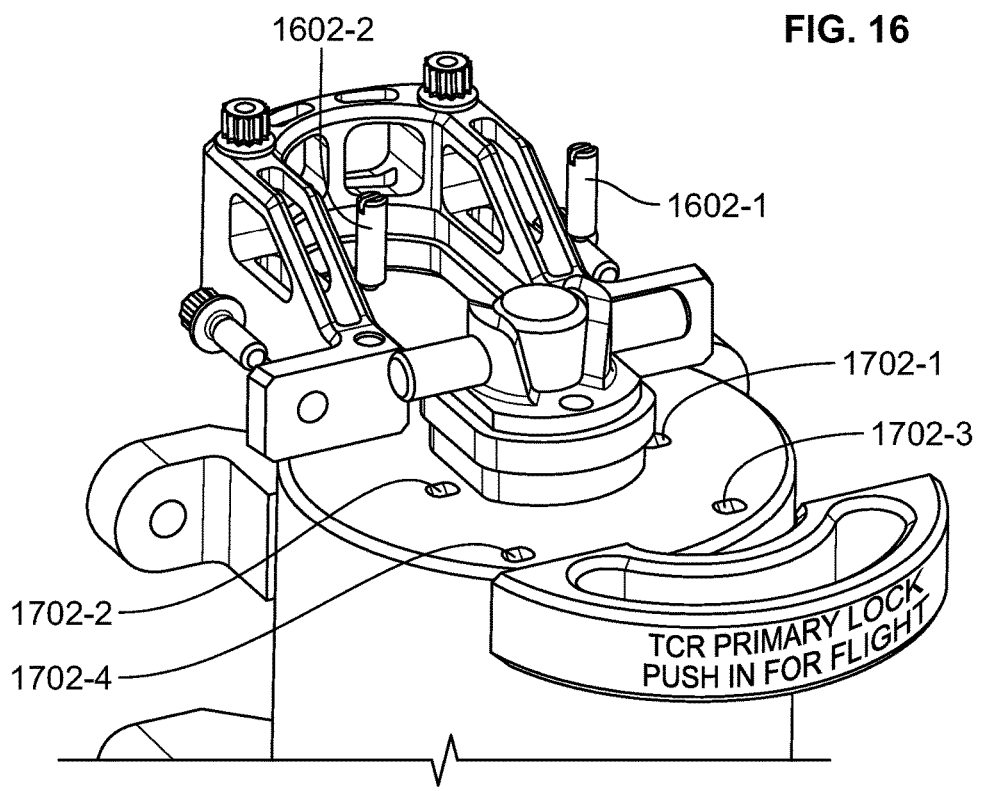
Figure 18:
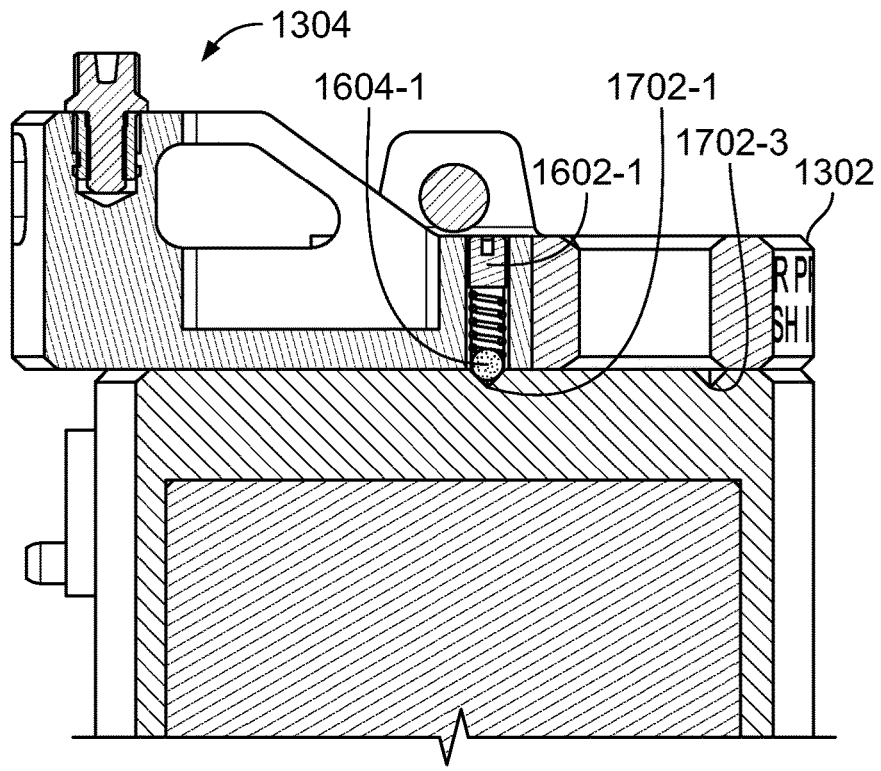
FIGS. 18 and 19 depict cross section views of a portion of the primary lock with the manual lock mechanism in a first (lock) position and a second (unlock) position, respectively.
Figure 19:
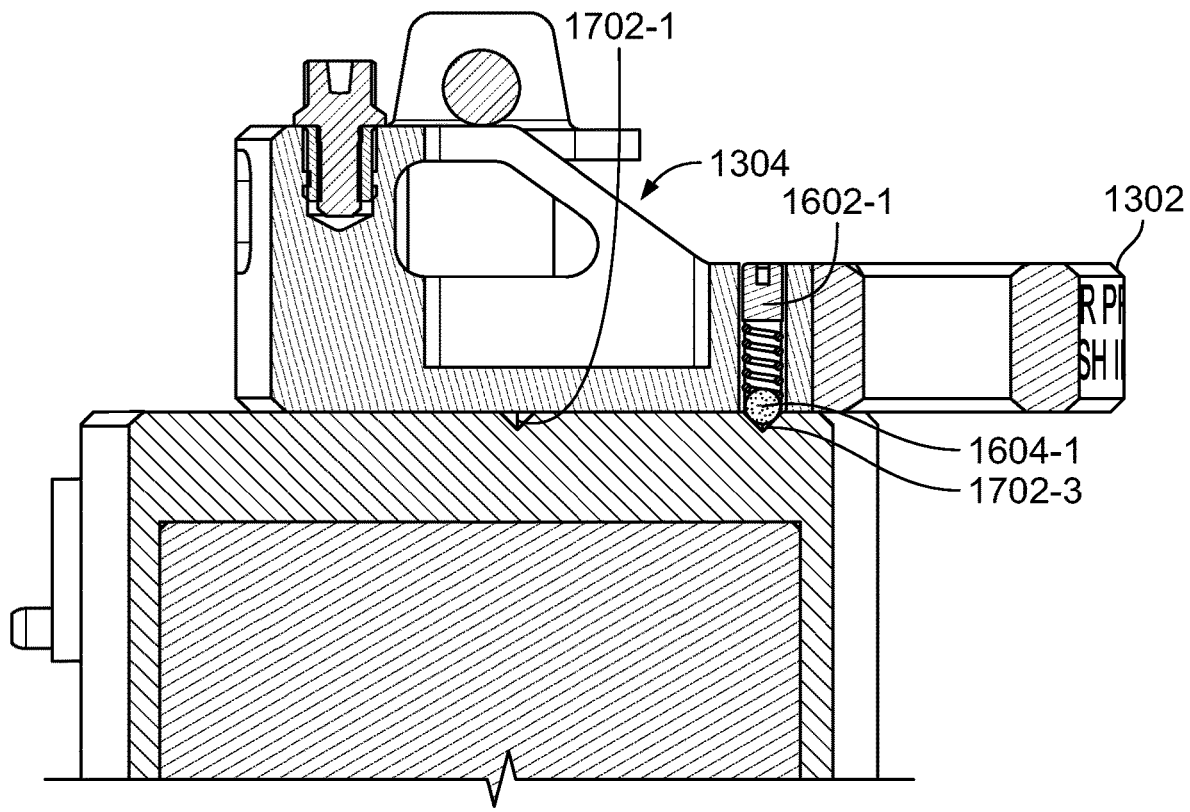

A pair of spring-loaded detent ball plungers 1602 (1602-1, 1602-2) are disposed within openings 1603 that are formed in the main section 1402 adjacent the pull handle 1302. The spring-loaded detent ball plungers 1602 each include a spring-loaded detent ball 1604 (1604-1, 1604-2), and are disposed such that each spring-loaded detent ball 1604 protrudes from its associated opening 1603, as is shown in FIG. 15. The detent balls 1604 are disposed within mating detents 1702 (1702-1, 1702-2, 1702-3, 1702-4) when, as shown in FIGS. 18 and 19 (and described more fully below), the manual lock mechanism 1300 is in its first position (FIG. 18) and in its section (FIG. 19).

Figure 20:
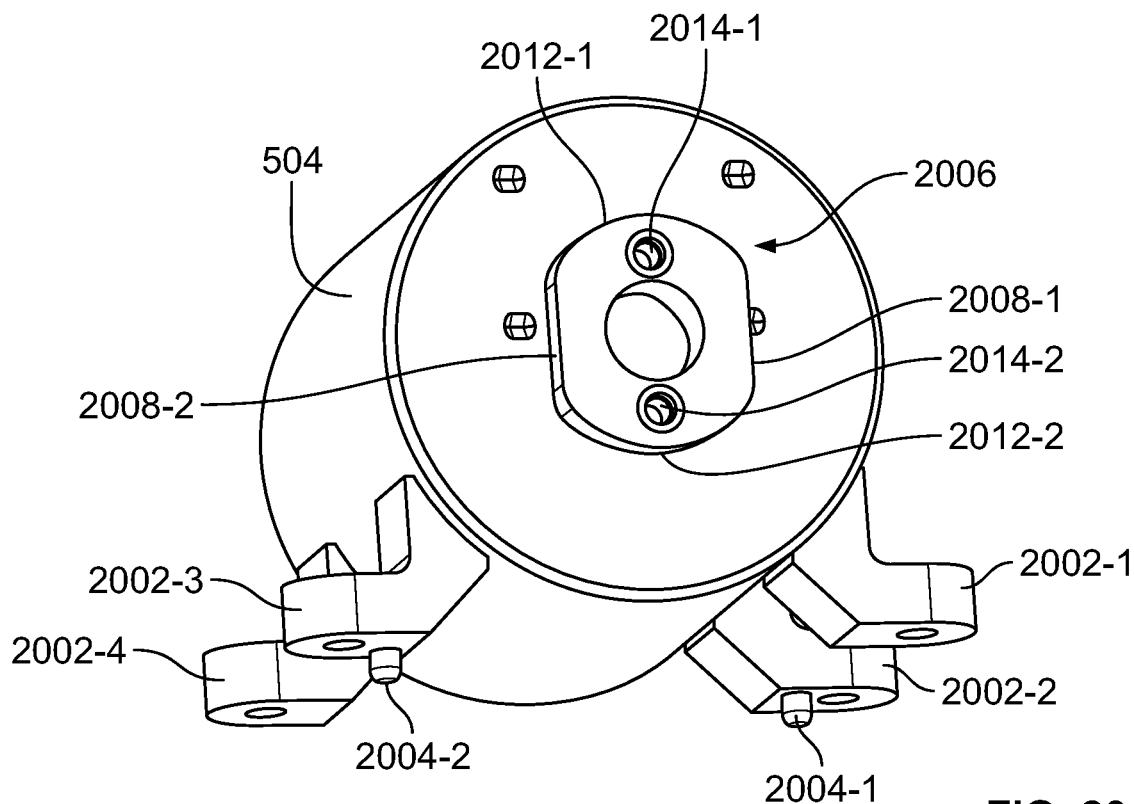
FIGS. 20 and 21 depict different plan views of a primary lock housing.
Figure 21:
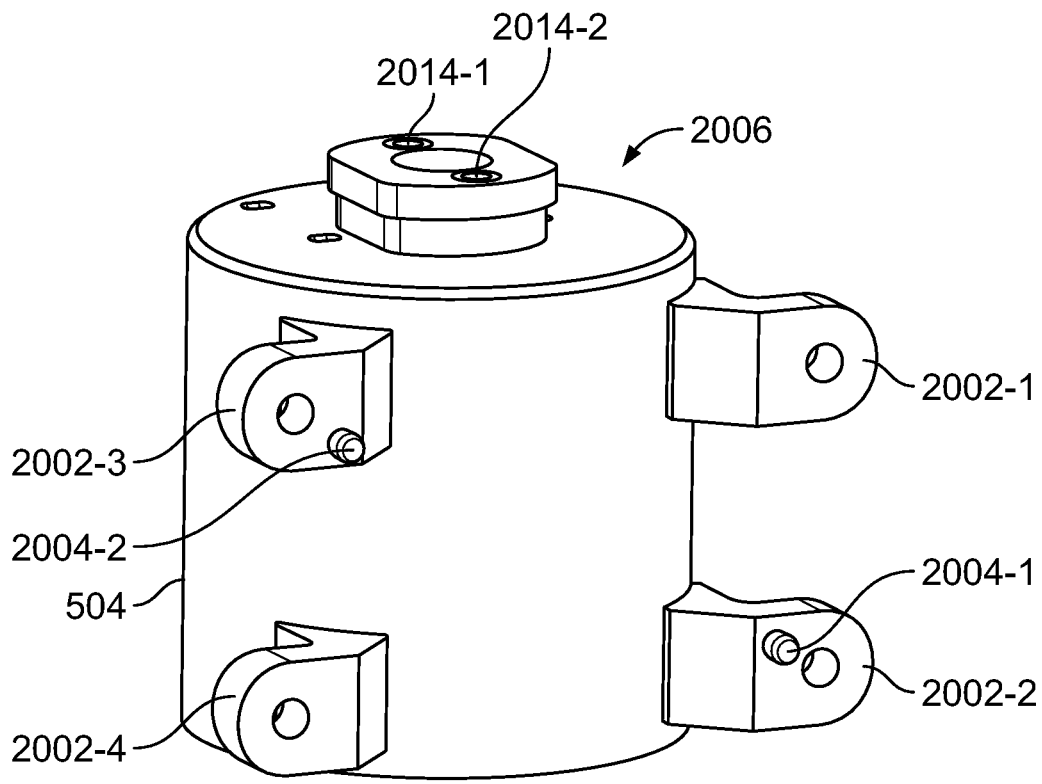

As noted above, the housing 504 has features formed thereon that mate with main section groove 1416 formed in the inner surface of the main section 1402. Referring briefly to FIGS. 20 and 21, which depict different views of one example embodiment of the housing 504, these features, as well as others, will now be described. The depicted housing 504 includes a plurality of attachment feet 2002 (2002-1, 2002-2, 2002-3, 2002-4), a plurality of alignment pins 2004 (2004-1, 2004-2), and a mount protrusion 2006.

Figure 22:
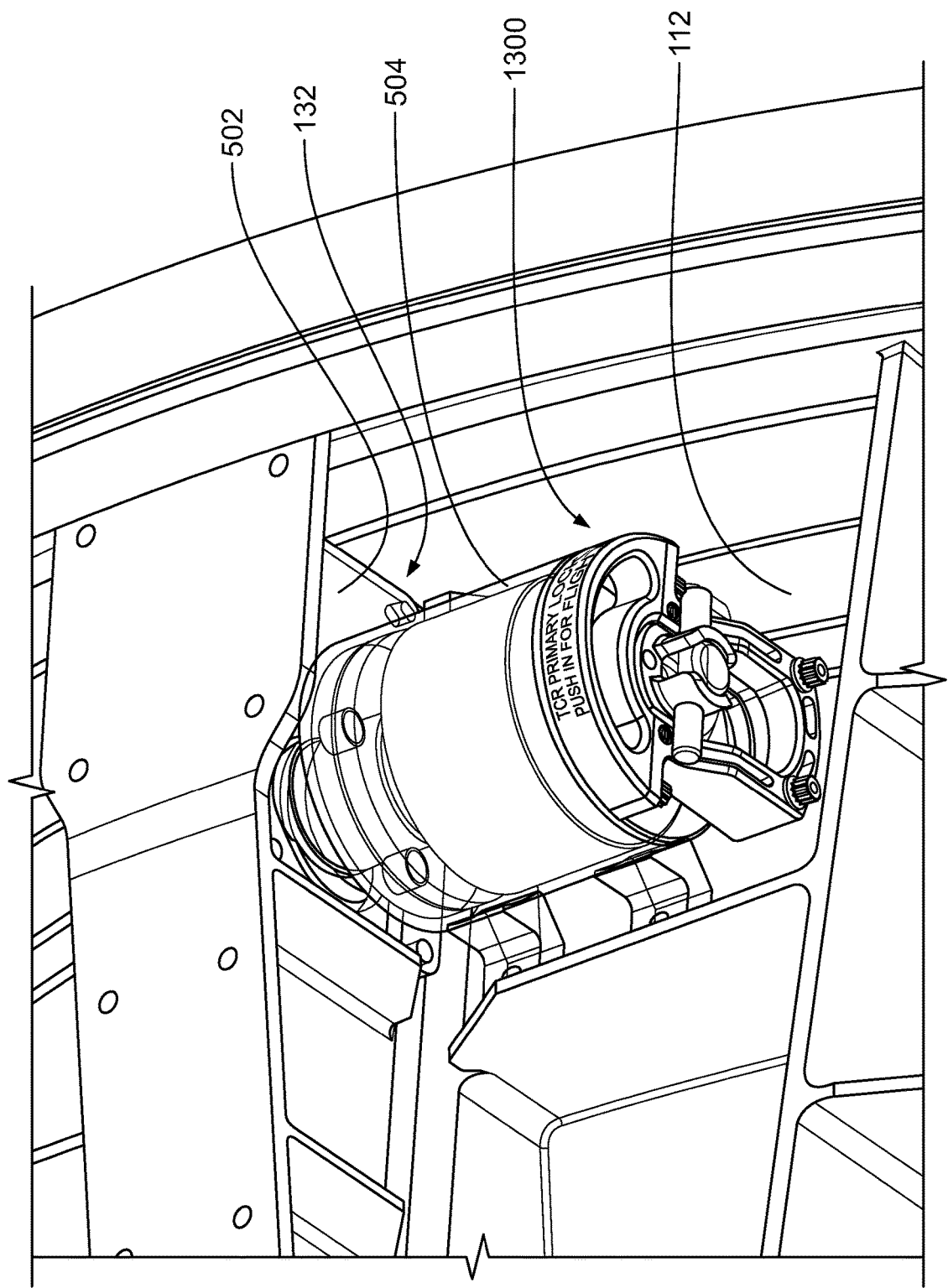
FIG. 22 depicts a plan view of the primary lock mounted within an aircraft propulsion engine thrust reverser system.

The attachment feet 2002 each include an opening through which fastener hardware may extend to mount the housing 504 to, for example, the above-mentioned support structure 112. The alignment pins 2004, which extend one each from two of the attachment feet 2002 (2002-1, 2002-3), are inserted into non-illustrated alignment openings that are formed in, for example, the support structure 112 and allow precise location when installed (see FIG. 22).

The mount protrusion 2006, which extends from the housing 504, has opposing flat features 2008 (2008-1, 2008-2) and opposing round features 2012 (2012-1, 2012-2) formed thereon. The flat features 2008 mate with portions of the main section groove 1416 formed on the inner surface 1412 of the main section 1402. The flat features 2008 constrain movement of the manual lock mechanism 1300 to translational movements in directions perpendicular to the lock 132. The round features 2012 selectively engage a groove 1606 (see FIG. 16) formed on the pull handle 1302 and a portion of the main section groove 1416 when the manual lock mechanism 1300 is in its first position (FIG. 18) and in its second position (FIG. 19), respectively.

Figure 23:
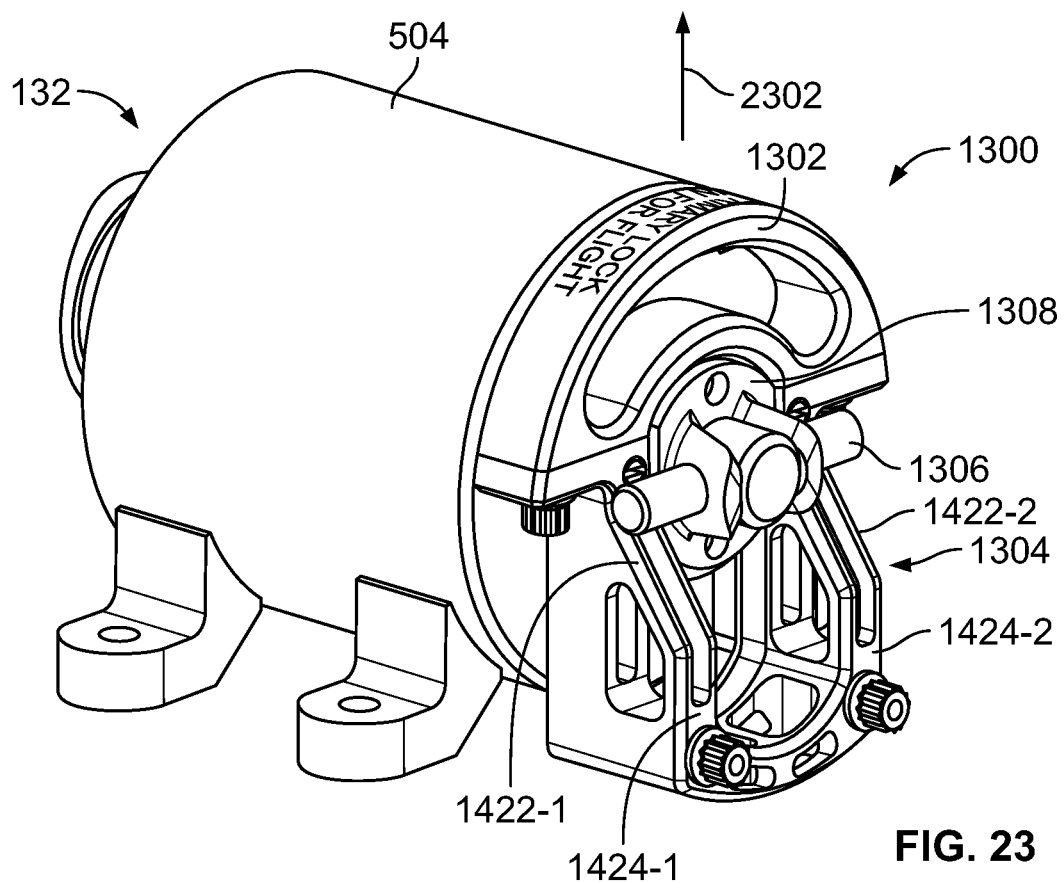
FIGS. 23 and 24 depict plan views of the primary lock with the manual lock mechanism in the first (lock) position and the second (unlock) position, respectively.
Figure 24:
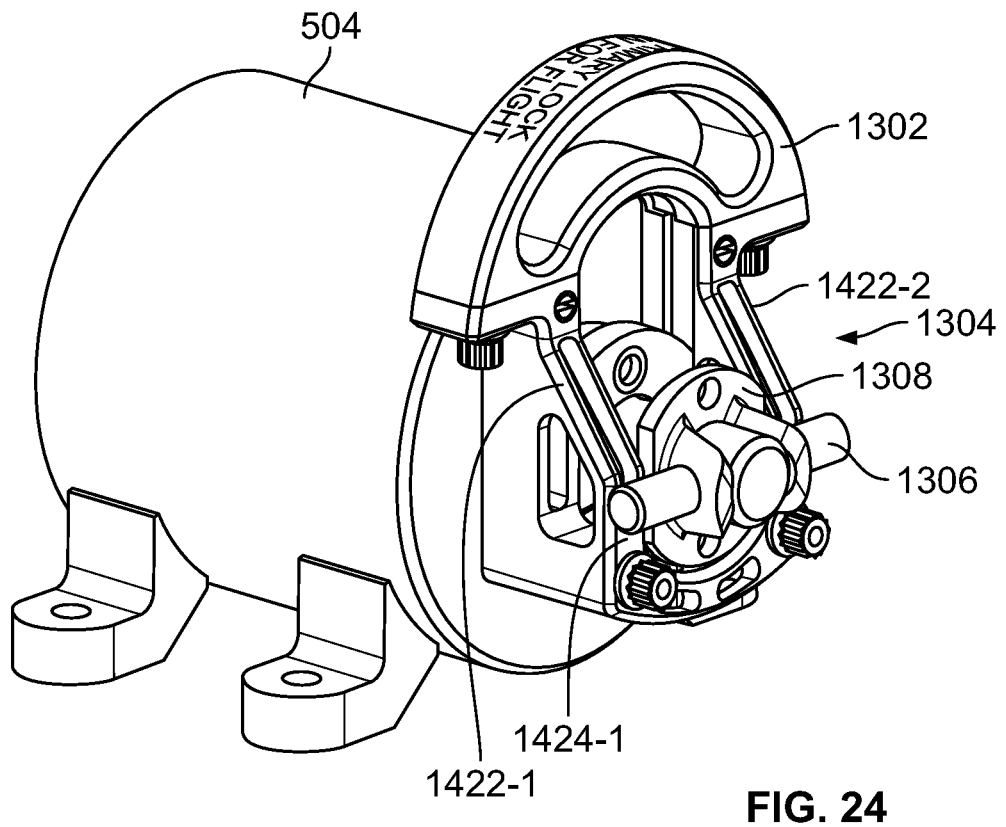

Having described the overall structure of the manual lock mechanism 1300, a description of its operation will now be provided. In doing so, reference should first be directed to FIG. 23, which shows the lock 132 in the lock position and the manual lock mechanism 1300 in the first position. If there is a need to manually move the lock 132 to the unlock position, a user will grasp the pull handle 1302 and apply a force in a first direction 2302, resulting in movement of the manual lock mechanism 1300 in the same direction. As a result, and as shown in FIG. 24, the pin 1306 is forced to travel up the ramp section 1422 of each arm 1418, thereby moving the lock out of the lock position. When the manual lock mechanism 1300 reaches its second position, the pin 1306 comes to rest on the land section 1424 of each arm 1418, and the lock 132 is in the unlock position. It should be noted that before the user can operate the manual lock mechanism 1300, a non-illustrated access panel near the lock 132 is removed, and the transcowl 114 is moved to the overstow position. Movement to the overstow position may be accomplished either by aircraft power, ground power, or by manually operating the actuators 124 that drive the transcowl 114.

Figure 25:
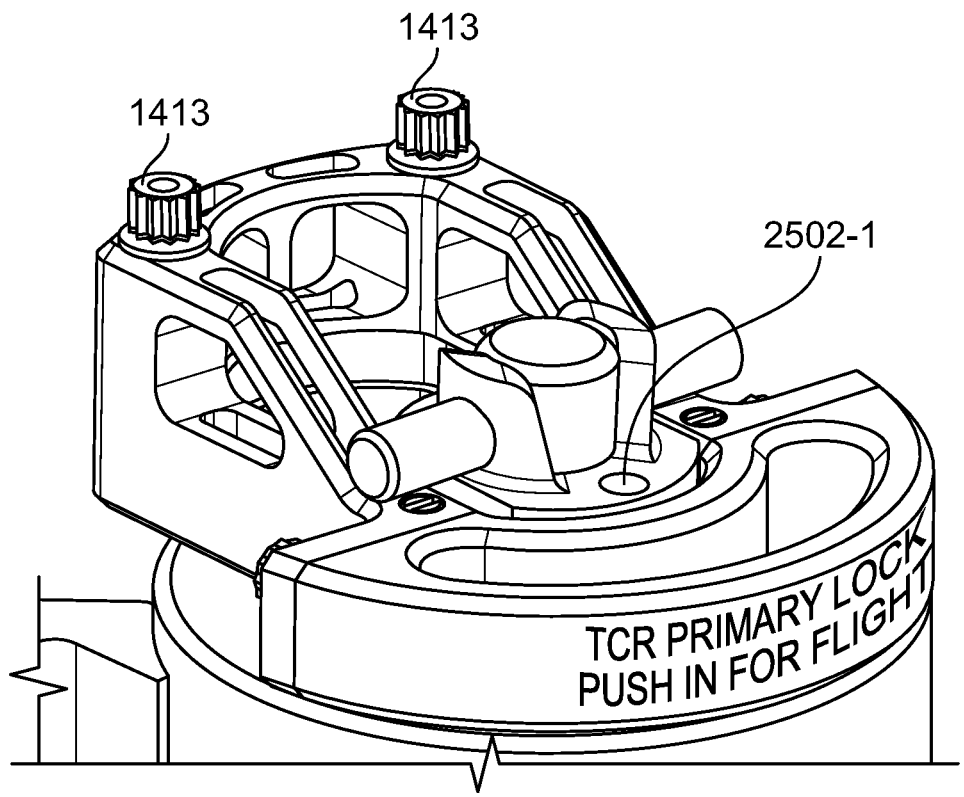
FIGS. 25 and 26 depict plan views of a portion of the primary lock with the manual lock mechanism in the first (lock) position, without and with, respectively, fasteners holding the manual lock mechanism in the first position.
Figure 26:
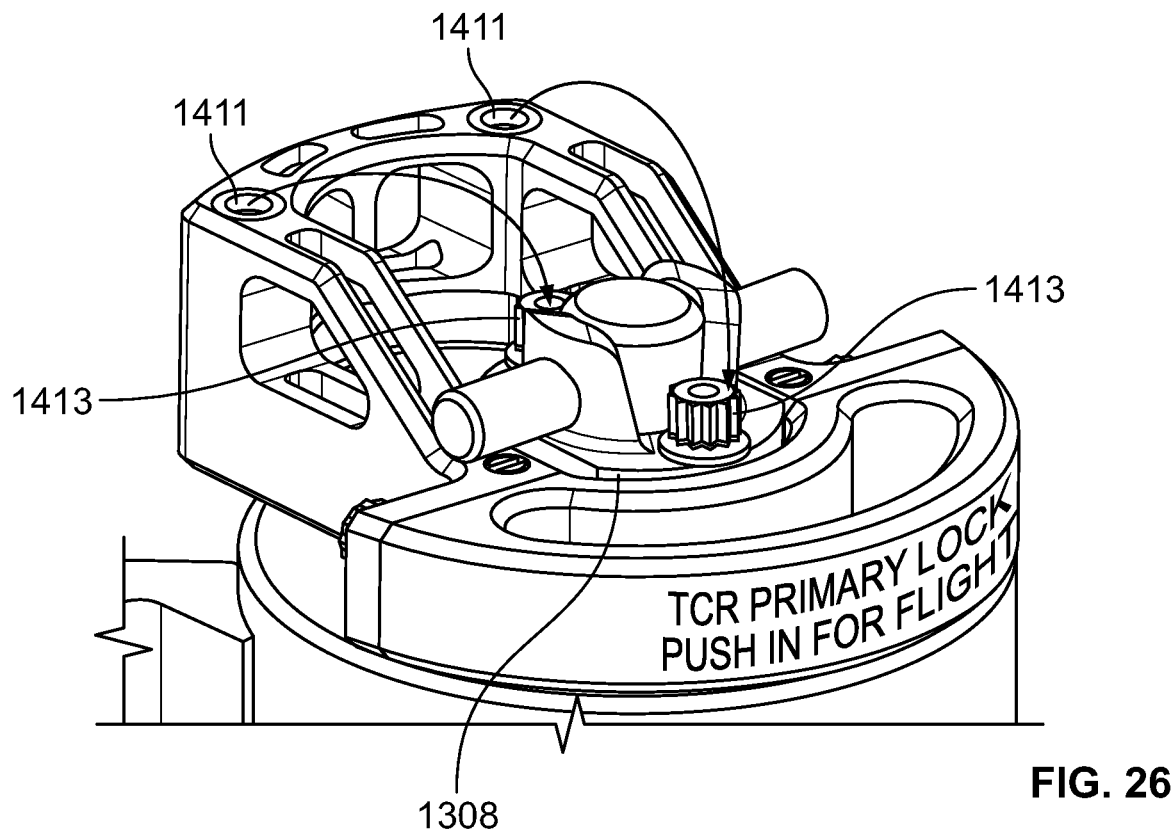

It was previously mentioned that the pin 1306 also extends through a lock plate 1308 that is mounted on the armature section 516. With reference now to FIGS. 25 and 26, the purpose of the lock plate 1308 will now be provided. As depicted in FIG. 25, the lock plate 1308 includes a pair of mount plate fastener openings 2502 (2502-1, 2502-2) (only one visible). The mount plate fastener openings 2502 align with mount protrusion fastener openings 2014 (2014-1, 2014-2) that are formed in the mount protrusion 2006 (see FIGS. 20 and 21). If needed (or desired) to prevent movement of the lock 132 out of the lock position, the fasteners 1413 that are disposed within the fastener openings 1411 of the fastener storage section 1408 may be moved (as shown using arrows in FIG. 26) and disposed through the mount plate fastener openings 2502 and into the mount protrusion fastener openings 2014.

Figure 27:
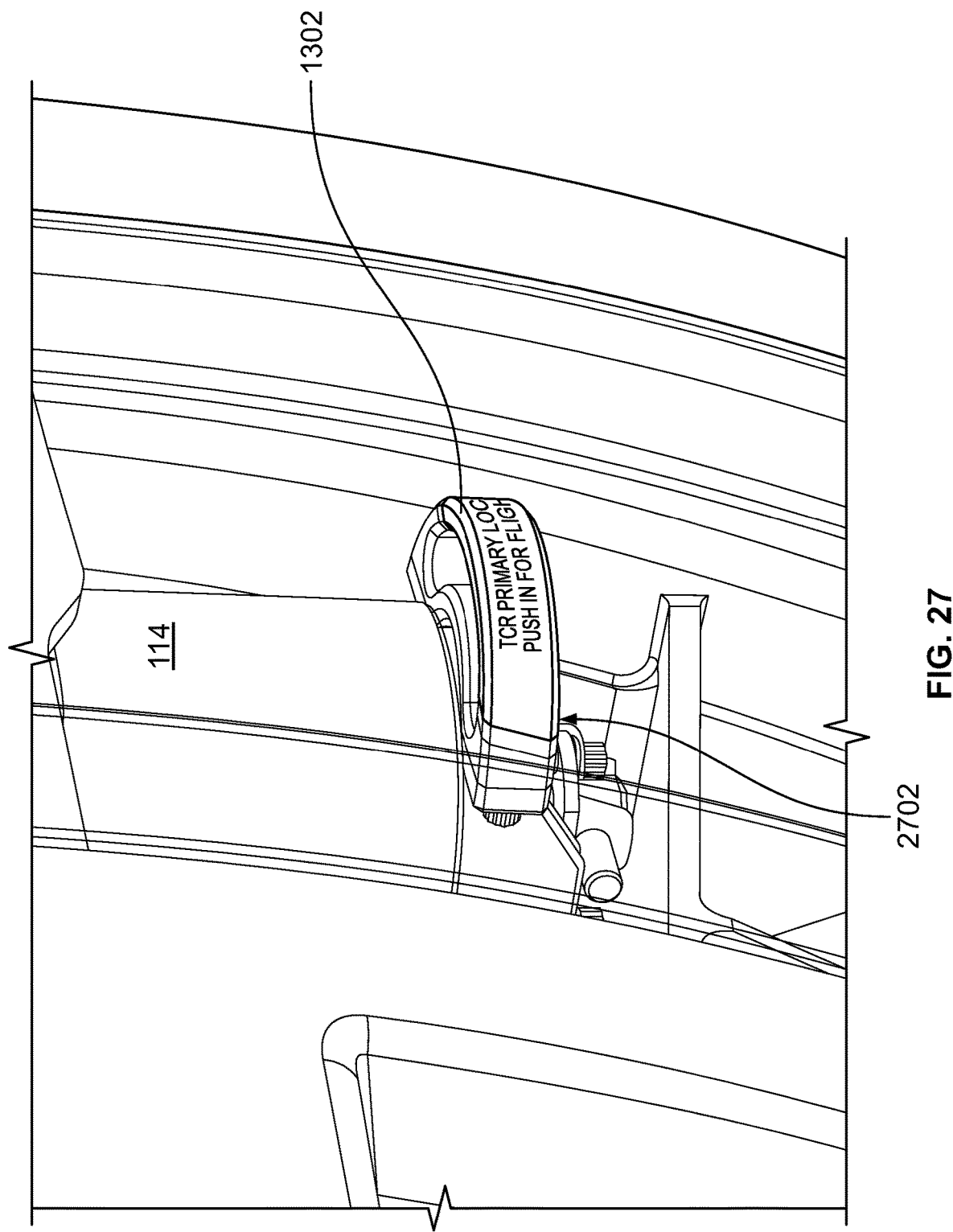
FIG. 27 depicts the primary lock in the second (unlock) position with the pull handle extending through an opening in a thrust reverser transcowl.
Figure 28:
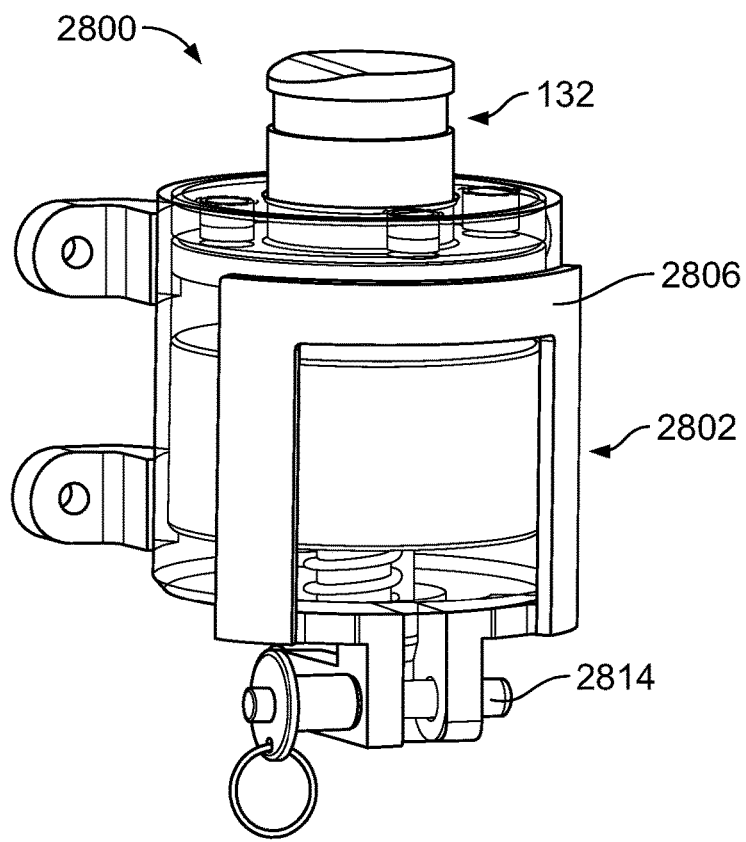
FIGS. 28-33 depict various views of an alternate embodiment of the primary lock.
Figure 29:
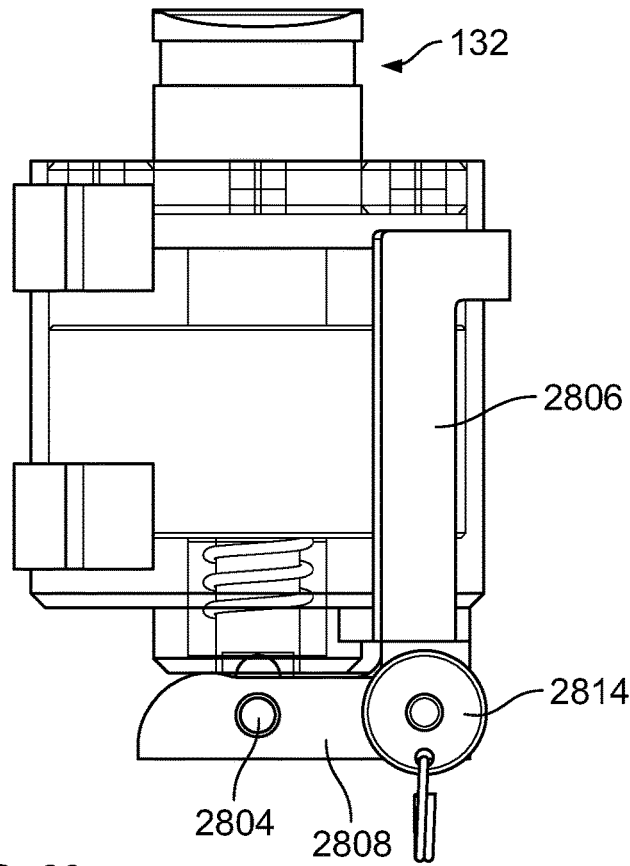

Referring now to FIG. 27, a user may access the manual lock mechanism 1300, or at least the pull handle 1302, via an opening 2702 in the transcowl 114. The opening 2702 is accessible by removing an access panel (not illustrated) removably mounted on the transcowl 114. As FIG. 27 depicts, the manual lock mechanism 1300 is preferably dimensioned such that the pull handle 1302, or at least a portion of the pull handle 1302, extends from the opening 2702 when the manual lock mechanism 1300 is in the second position, and thus the lock 132 is in the unlock position. With this configuration, the access panel, when removed, can only be replaced if the manual lock mechanism 1300 is in the first position. As may be appreciated, if the fasteners 1413 are not disposed through the mount plate fastener openings 2502 and in the mount protrusion fastener openings 2014, if a user tries to force the access panel back into place while the manual lock mechanism 1300 is in the second position, the access panel will push the manual lock mechanism 1300 back into the first position.

It is additionally noted that the pull handle 1302 is preferably labeled, using suitable indicia, to indicate that the manual lock mechanism 1300 must be in the first position for flight. For example, as depicted in several of the figures, the pull handle 1302 may be labeled, "TCR PRIMARY LOCK PUSH IN FOR FLIGHT", or other suitable indicia.

Figure 30:
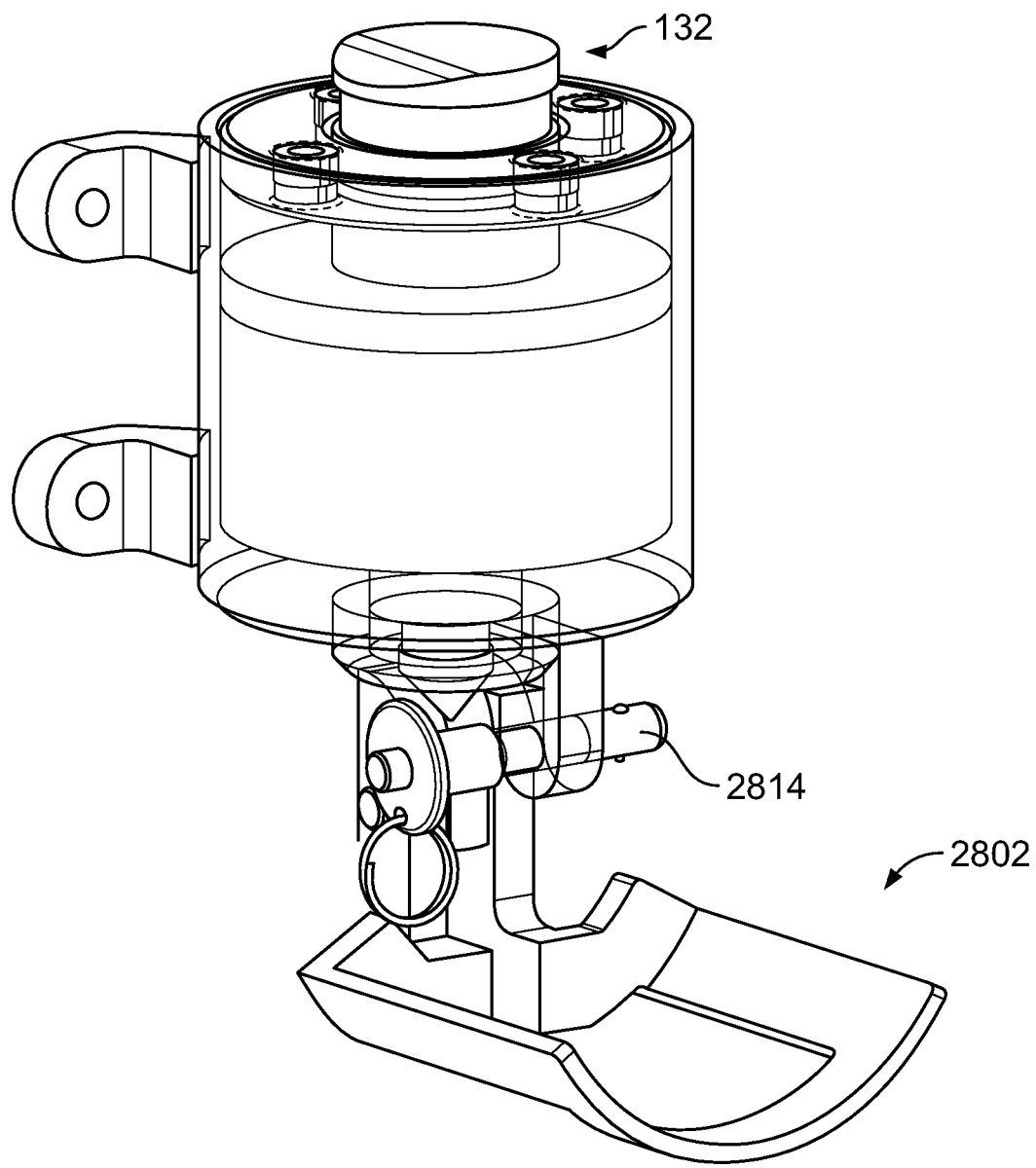
Figure 31:
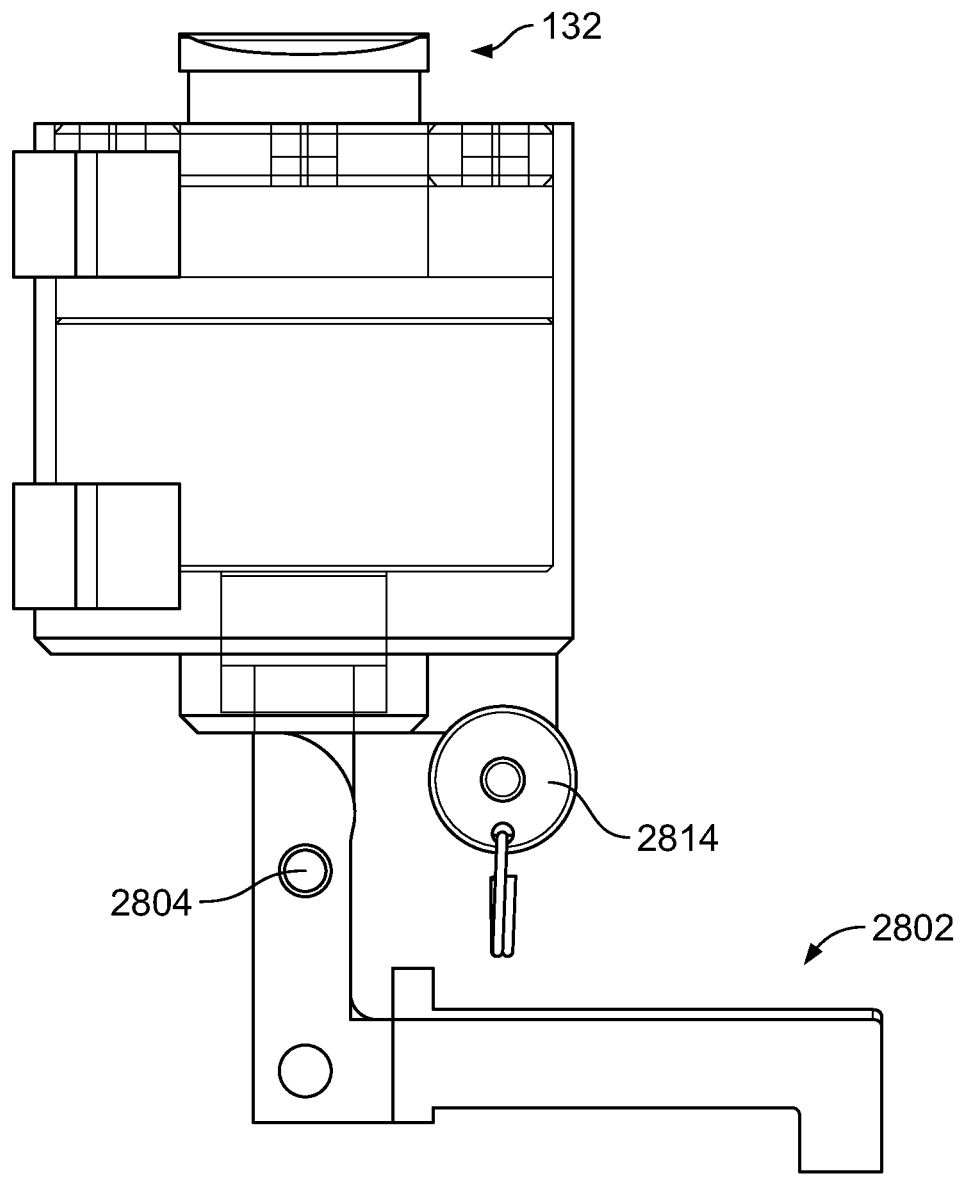

The manual lock mechanism 1300 depicted in FIGS. 13-27 and described above is merely exemplary of one particular suitable configuration. It will be appreciated that the manual lock mechanism 1300 may be variously configured. For example, one alternative manual lock mechanism 2800, which is depicted in FIGS. 28-33, is configured with a handle 2802 that is rotationally coupled to the lock 132 via, for example, a pin 2804, and has a cylindrical portion 2806 and a cam portion 2808. The cylindrical portion 2806 is shaped to match the contour of the housing 504. The cam portion 2808 extends perpendicularly from the cylindrical portion 2806 and has a cam profile near the rotational axis of the handle 2802. Thus, as shown in FIGS. 30 and 31, when the handle 2802 is rotated from the first position (FIGS. 28 and 29), in which the lock 132 is in the lock position, into the second position, the lock 132 is moved to the unlock position.

Figure 32:
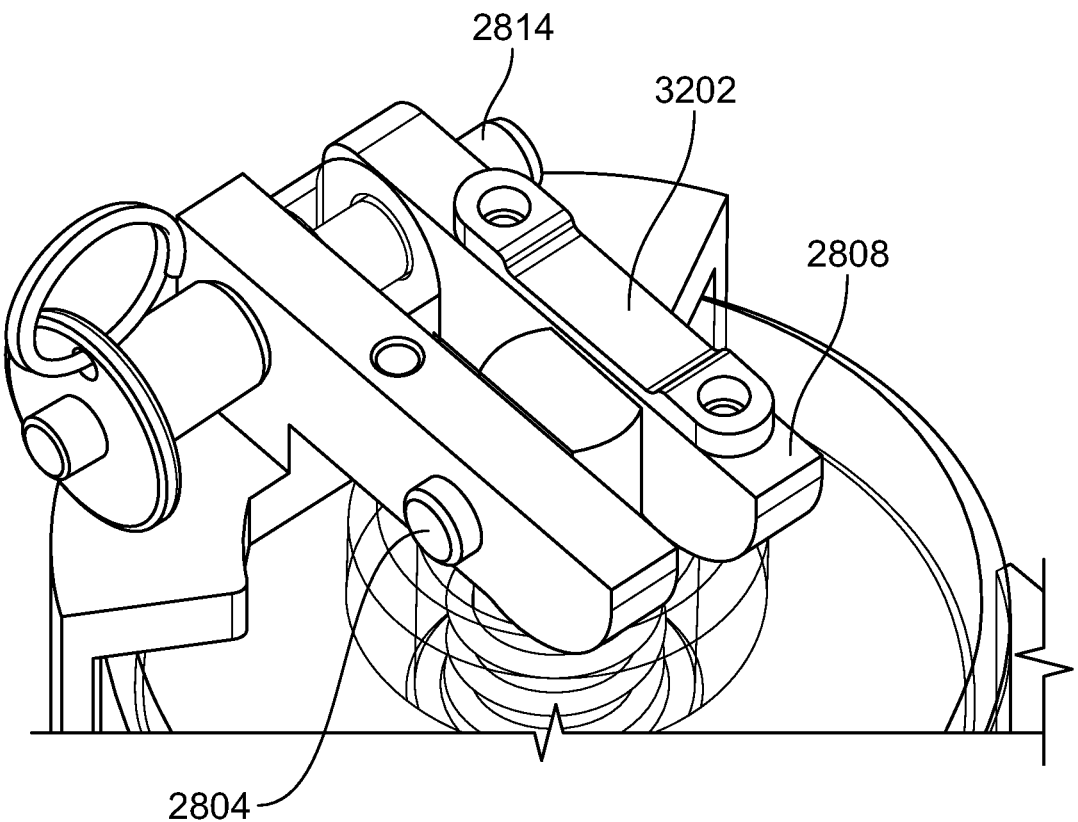
Figure 33:
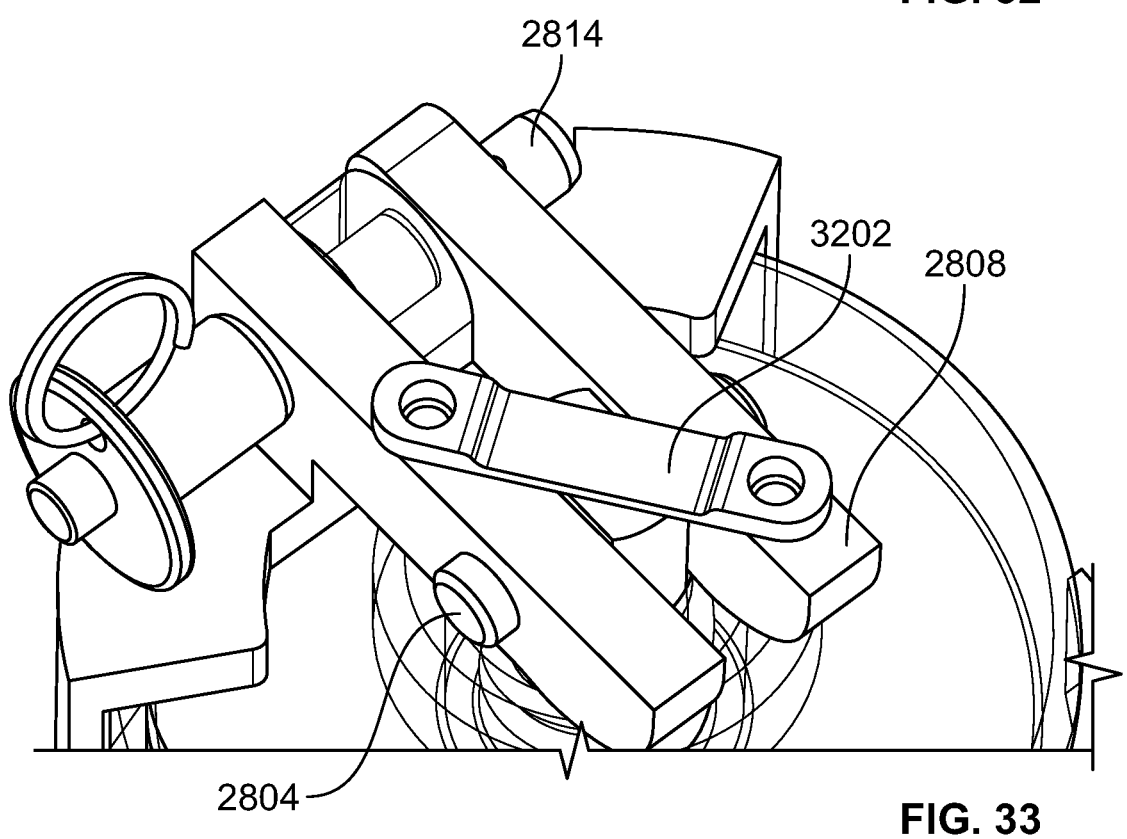
Figure 35:
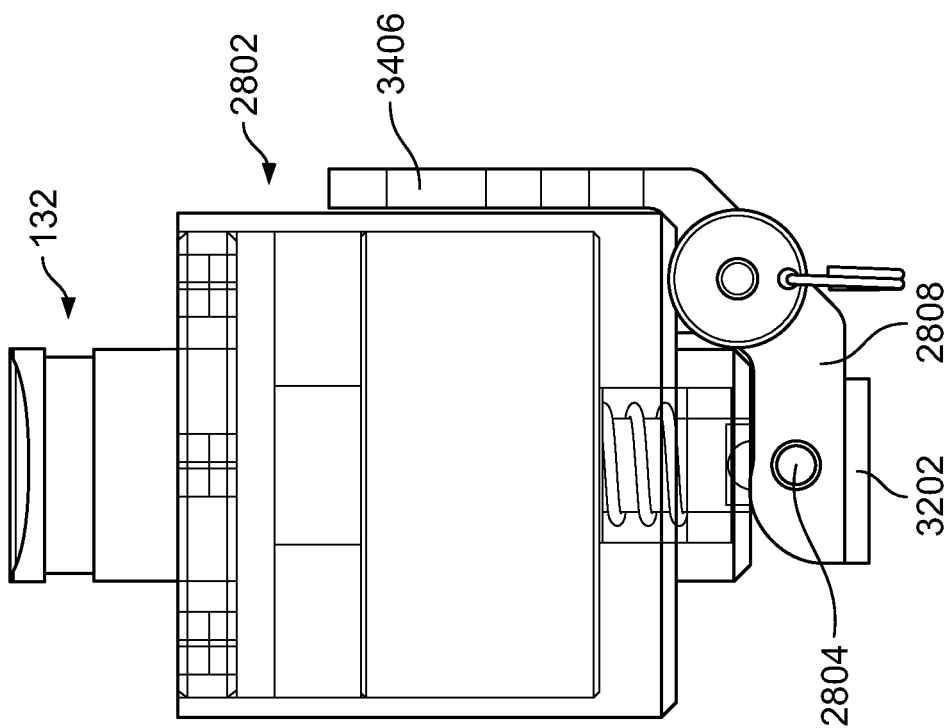
FIGS. 34-37 depict various views of another alternate embodiment of the primary lock.
Figure 34:
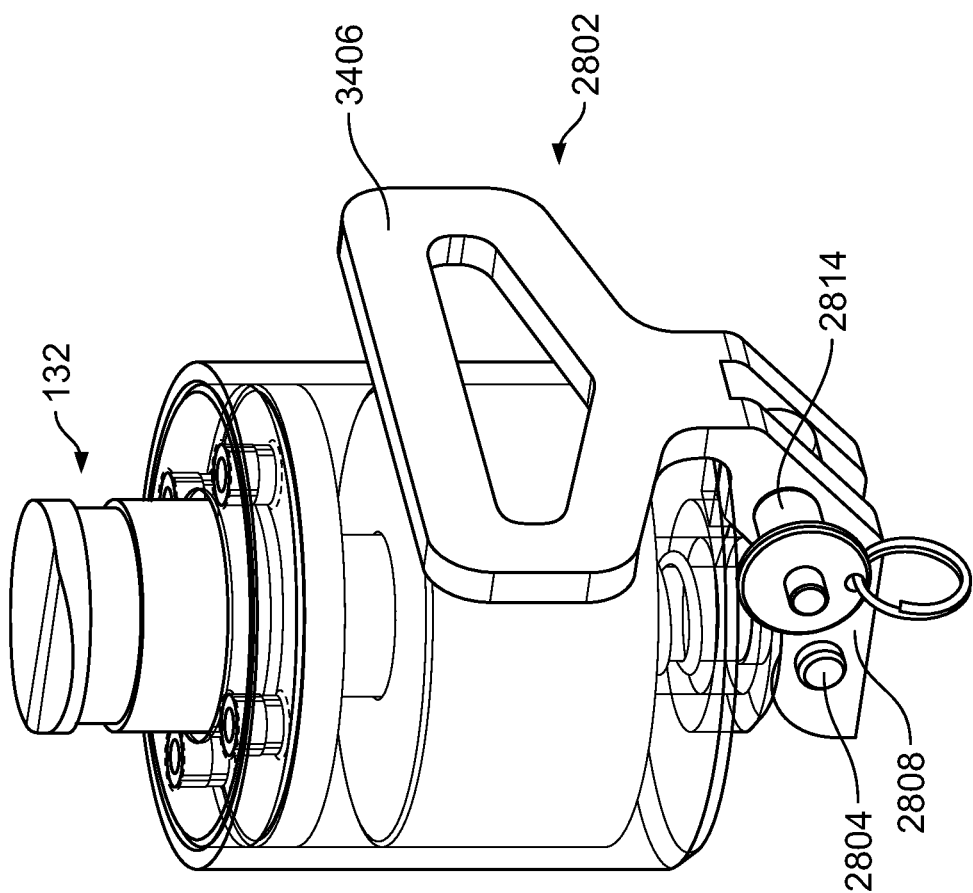
Figure 37:
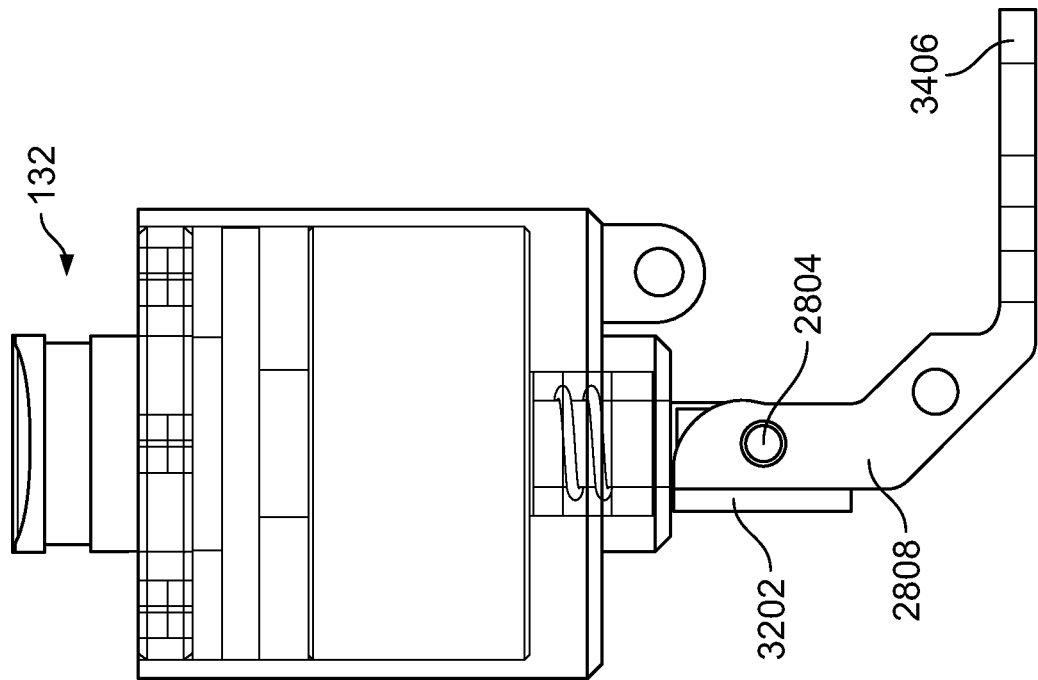
Figure 36:
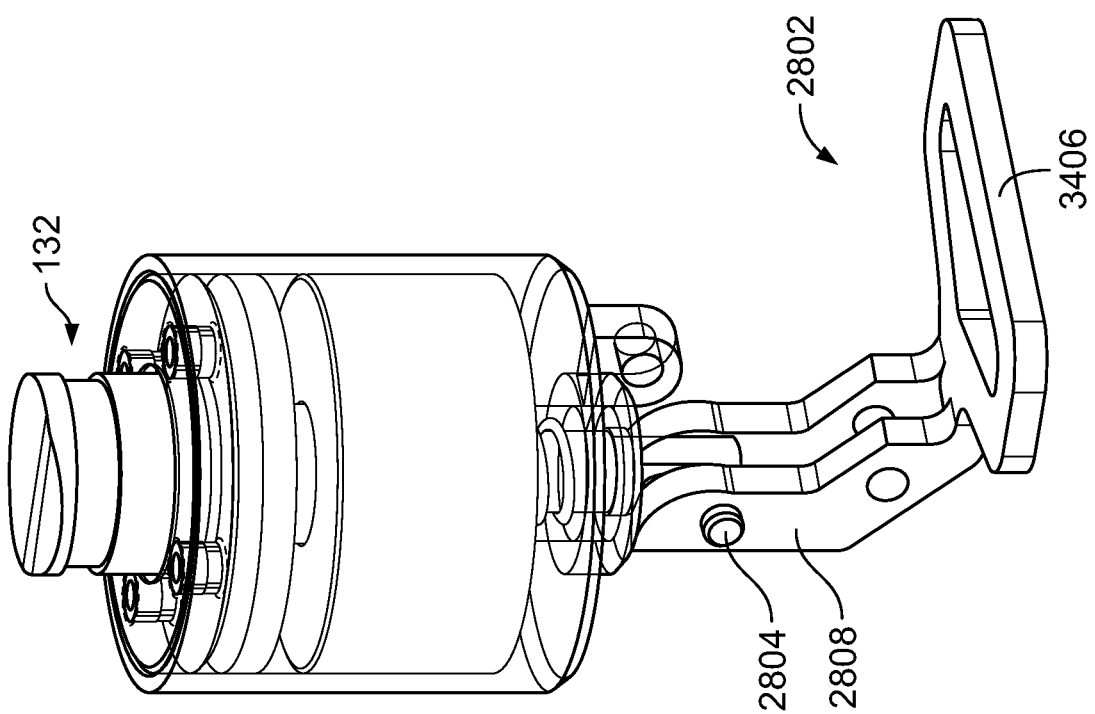

As FIGS. 28-31 also depict, the depicted manual lock mechanism 2800 may additionally include a ball lock pin 2814 that is configured to keep the handle 2802 in the first position during flight. Moreover, as FIGS. 32-33 depict, the manual lock mechanism 2800 may also include a moveable gate 3202 that can be rotated into a position to maintain the lock 132 in the lock position.

Yet another alternative manual lock mechanism 3400 is depicted in FIGS. 34-37. This manual lock mechanism 3400 is configured almost identical to the one depicted in FIGS. 28-33. As such, like parts between the two embodiments are labeled using identical reference numerals. The only difference between the two embodiments is that the handle 3402 depicted in FIGS. 34-37 does not include a cylindrical portion 2806. Rather, instead of a cylindrical portion 2806, it includes a flat-shaped portion 3406. Other than this difference, the operation is identical to the manual lock mechanism 2800 depicted in FIGS. 28-33.

Figure 40:
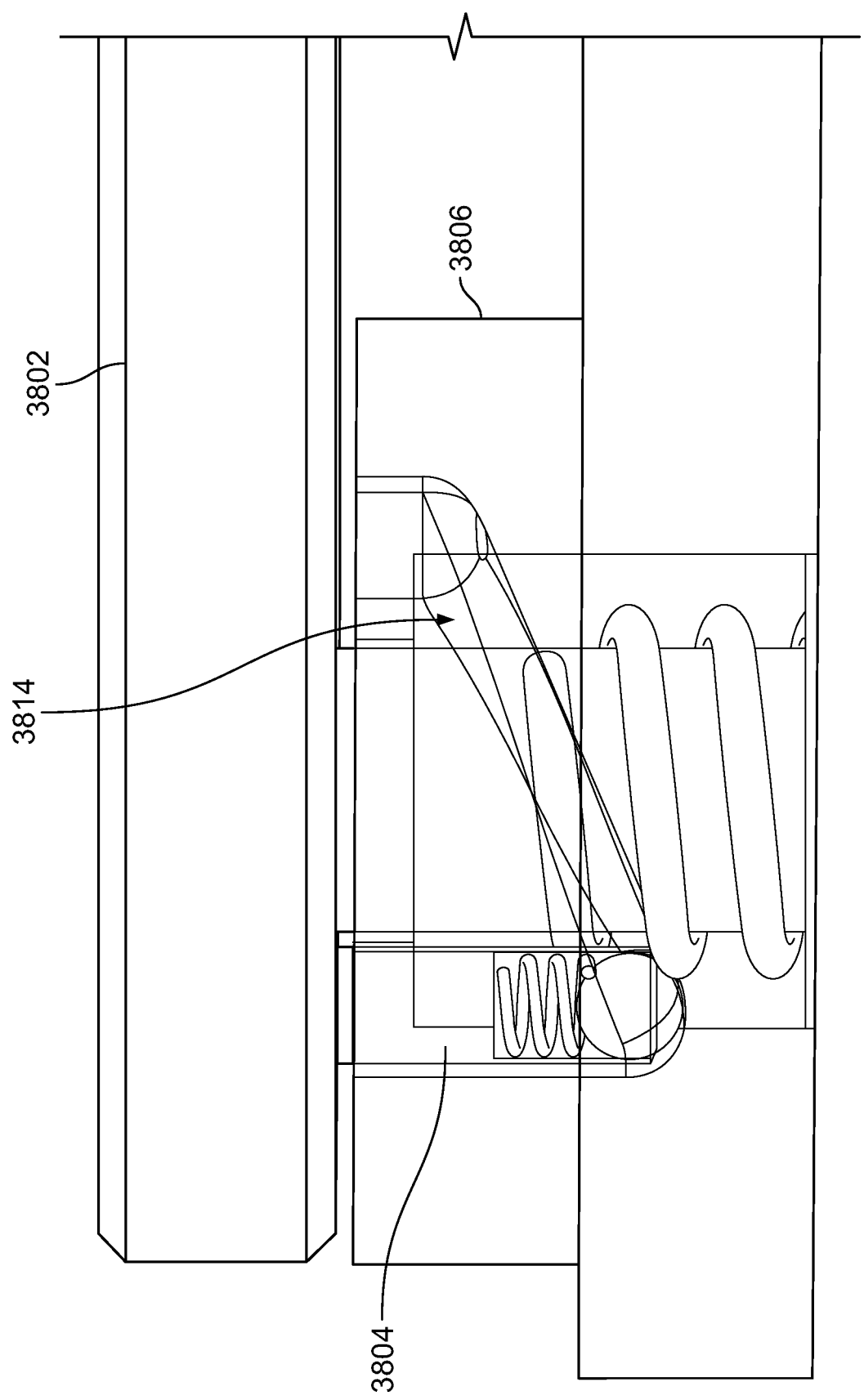

One additional alternative manual lock mechanism embodiment is depicted in FIGS. 38-40. In this embodiment, the manual lock mechanism 3800 includes a handle 3802, a spring-loaded ball plunger 3804, and a groove housing 3806. The handle 3802 is coupled to the lock 132 and is rotatable about an axis 3808 that extends longitudinally through the lock 132. The spring-loaded ball plunger 3804 is coupled to, and extends perpendicularly from, the handle 3802 into the groove housing 3806. The spring-loaded ball plunger 3804 includes a ball 3812 that rides within a ramped groove 3814 that is formed in the groove housing 3806. Thus, as the handle 3802 is rotated, the ball 3812 rides in the ramped groove 3814 causing the spring-loaded ball plunger 3804 to move the lock 132 of the lock position. Because the handle 3802 is coupled to the lock 132, the lock 132 rotates with the handle 3802.

The primary lock system described herein meets the same standards of reliability as a hook-type locking system, but with less amount of overstow, while being able to fit within a relatively small space envelope. The system also provides manual unlock capability for ground maintenance, and the ability to be locked in place in the unlikely event of a damaged thrust reverser or lock component.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A primary lock system for a gas turbine propulsion engine translating cowl thrust reverser system that includes at least one translating cowl that is movable to a stowed position, an overstow position, and a deployed position, comprising:
    a cowl lock structure adapted to be mounted on, and movable with, the at least one translating cowl between at least the stowed position and the deployed position;
    a cowl lock structure position sensor configured to sense when the at least one translating cowl is in the overstow position and when the at least one translating cowl is not in the overstow position and supply a cowl lock structure position signal;
    a housing adapted to be fixedly mounted to a non-movable structure;
    a lock disposed at least partially within, and movable relative to, the housing, the lock responsive to an unlock command to move between a lock position, in which the lock prevents movement of the cowl lock structure toward the deployed position, and an unlock position, in which the lock does not prevent movement of the cowl lock structure toward the deployed position;
    a lock position sensor configured to sense when the lock is in the lock position and when the lock is not in the lock position and supply a lock position signal;
    a controller in operable communication with the lock, the cowl lock structure position sensor, and the lock position sensor, the controller responsive to the cowl lock structure position signal and the lock position signal to at least selectively supply the unlock command to the lock only when (i) the lock position sensor senses that the lock is in the lock position and (ii) the cowl lock structure position sensor senses that the transcowl is in the overstow position; and
    a manual mechanism coupled to the lock and configured, in response to a manual input force supplied to the manual mechanism, to (i) selectively move from a first position to a second position, whereby the lock is selectively moved from the lock position to the unlock position, respectively and (ii) selectively prevent movement of the lock out of the lock position, the manual mechanism comprising:
        a pin extending perpendicularly through the lock and movable therewith;
        a pull handle dimensioned to be grasped by a hand of a user; and
        a ramp slider coupled to the pull handle, the ramp slider mounted on and movable relative to the housing and disposed to at least selectively engage the pin.

2. The primary lock system of claim 1, wherein:
    the lock position sensor is further configured to supply the lock position signal to cockpit instrumentation;
    the cowl lock structure position sensor is further configured to supply the cowl lock structure position signal to the cockpit instrumentation; and
    the controller is configured to at least selectively supply the unlock command to the lock only when (i) the lock position sensor senses that the lock is in the lock position and (ii) the cowl lock structure position sensor senses that the cowl lock structure is in the overstow position.

3. The primary lock system of claim 1, wherein the lock comprises:
    a piston translatable between the lock and unlock position; and
    an actuator responsive to the unlock command to move the piston between the lock and unlock position.

4. The primary lock system of claim 3, wherein the actuator is an electrical actuator, a hydraulic actuator, a pneumatic actuator, or combination thereof.

5. The primary lock system of claim 1, wherein the lock is spring-loaded to the lock position.

6. The primary lock system of claim 1, wherein the ramp slider comprises:
    a main section coupled to the pull handle; and
    a ramp section extending from the mount section at non-zero angle and at least selectively engaging the pin.

7. The primary lock of claim 6, wherein:
    the main section includes a mount section and a fastener storage section, the mount section having a mount section first end and a mount section second end, the mount section first end coupled to the pull handle, the fastener storage section extending perpendicularly from the mount section second end; and
    the ramp section includes a pair of spaced-apart arms, each arm including a ramp section and an associated land section, each ramp section extending from the mount section first end toward its associated land section at the non-zero angle, each land section extending perpendicularly from the fastener storage section and connecting to its associated ramp section.

8. The primary lock system of claim 7, further comprising:
a lock plate mounted on the lock and through with the pin extends, the lock plate having a plurality of lock plate openings formed therein;
a plurality of housing fastener openings formed in the housing, each housing fastener opening aligned with a different one of the lock plate openings;
a plurality of fastener storage section fastener openings formed in the fastener storage section; and
a plurality of fasteners, each fastener disposed within a different one of the fastener storage section fastener opening and selectively movable for disposition into a different one of the housing fastener openings.

9. The primary lock system of claim 7, wherein:
the main section has an inner surface that defines a cavity through which a portion of the lock extends;
a main section groove is formed on the inner surface; and
a pull handle groove is formed on a surface of the pull handle.

10. The primary lock system of claim 9, further comprising:
a mount protrusion extending from the housing, the mount protrusion having opposing flat features and opposing round features formed thereon,
wherein:
the flat features mate with portions of the main section groove and constrain movement of the manual mechanism to translational movements, and
the round features selectively engage the pull handle groove and a portion of the main section groove when the manual mechanism is in the first position and in the second position, respectively.

11. A primary lock for a translating cowl thrust reverser system, comprising:
a housing;
a lock disposed at least partially within, and movable relative to, the housing and movable between a lock position and an unlock position; and
a manual mechanism coupled to the lock and configured, in response to a manual input force supplied to the manual mechanism, to:
selectively move from a first position to a second position, whereby the lock is selectively moved from the lock position to the unlock position, respectively; and
selectively prevent movement of the lock out of the lock position, wherein the manual mechanism comprises:
a pin extending perpendicularly through the lock and movable therewith;
a pull handle dimensioned to be grasped by a hand of a user; and
a ramp slider coupled to the pull handle, the ramp slider mounted on and movable relative to the housing and disposed to at least selectively engage the pin.

12. The primary lock of claim 11 wherein the lock comprises:
a piston disposed partially within, and extending from, the housing, the piston translatable between the lock and unlock position;

a spring disposed within the housing and supplying a spring force to the piston that urges the piston toward the lock position; and
an actuator configured to supply a force to the piston.

13. The primary lock system of claim 11, wherein the actuator is an electrical actuator, a hydraulic actuator, a pneumatic actuator, or combination thereof.

14. The primary lock of claim 11, wherein the ramp slider comprises:
a main section coupled to the pull handle; and
a ramp section extending from the mount section at non-zero angle and at least selectively engaging the pin.

15. The primary of claim 14, wherein:
the main section includes a mount section and a fastener storage section, the mount section having a mount section first end and a mount section second end, the mount section first end coupled to the pull handle, the fastener storage section extending perpendicularly from the mount section second end; and
the ramp section includes a pair of spaced-apart arms, each arm including a ramp section and an associated land section, each ramp section extending from the mount section first end toward its associated land section at the non-zero angle, each land section extending perpendicularly from the fastener storage section and connecting to its associated ramp section.

16. The primary lock of claim 15, further comprising:
a lock plate mounted on the lock and through which the pin extends, the lock plate having a plurality of lock plate openings formed therein;
a plurality of housing fastener openings formed in the housing, each housing fastener opening aligned with a different one of the lock plate openings;
a plurality of fastener storage section fastener openings formed in the fastener storage section; and
a plurality of fasteners, each fastener disposed within a different one of the fastener storage section fastener opening and selectively movable for disposition into a different one of the housing fastener openings.

17. The primary lock of claim 14, wherein the housing comprises:
a plurality of attachment feet, each including an opening through which a fastener may extend;
a plurality of alignment pins extending one each from at least two of the attachment feet; and
a mount protrusion extending from the housing and having opposing flat features and opposing round features formed thereon,
wherein:
the main section has an inner surface that defines a cavity through which a portion of the lock extends,
a main section groove is formed on the inner surface,
a pull handle groove is formed on a surface of the pull handle,
the opposing flat features mate with portions of the main section groove and constrain movement of the manual mechanism to translational movements, and
the opposing round features selectively engage the pull handle groove and a portion of the main section groove when the manual mechanism is in the first position and in the second position, respectively.

* * * * *